US011027314B2

(12) United States Patent
Mariniello et al.

(10) Patent No.: US 11,027,314 B2
(45) Date of Patent: *Jun. 8, 2021

(54) TRANSPORT SCHEDULING FOR LOW MICROBIAL BULK PRODUCTS

(71) Applicant: Ardent Mills, LLC, Denver, CO (US)

(72) Inventors: Robert Mariniello, Bellevue, NE (US); Edith D. Akins-Lewenthal, Omaha, NE (US); Ryan T. Grace, Omaha, NE (US)

(73) Assignee: Ardent Mills, LLC, Denver, CO (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/239,340

(22) Filed: Jan. 3, 2019

(65) Prior Publication Data

US 2019/0134678 A1 May 9, 2019

Related U.S. Application Data

(63) Continuation of application No. 13/741,882, filed on Jan. 15, 2013, now Pat. No. 10,213,811, which is a continuation of application No. 13/010,511, filed on Jan. 20, 2011, now Pat. No. 8,412,642.

(60) Provisional application No. 61/354,962, filed on Jun. 15, 2010.

(51) Int. Cl.
*B08B 3/04* (2006.01)
*G06Q 10/08* (2012.01)
*G06Q 10/10* (2012.01)

(52) U.S. Cl.
CPC ........... *B08B 3/04* (2013.01); *G06Q 10/0832* (2013.01); *G06Q 10/1097* (2013.01); *Y10T 436/10* (2015.01)

(58) Field of Classification Search
CPC .. B08B 3/04; G06Q 10/0832; G06Q 10/1097; Y10T 436/10
See application file for complete search history.

(56) References Cited

U.S. PATENT DOCUMENTS

| 2,379,677 | A | 7/1945 | Borsakovsky |
| 2,525,599 | A | 10/1950 | Gustayson |
| 3,159,495 | A | 12/1964 | Japikse |
| 3,368,904 | A | 2/1968 | Galle et al. |
| 3,428,461 | A | 2/1969 | Hatton et al. |
| 3,490,917 | A | 1/1970 | Doe et al. |

(Continued)

FOREIGN PATENT DOCUMENTS

| EP | 0512259 A2 | 11/1992 |
| EP | 0552006 A1 | 7/1993 |

(Continued)

OTHER PUBLICATIONS

Davis, Mary, "Totally Tanker Interiors," Bulk Transporter, Mar. 1, 2006, available at: http://bulktransporter.com/archive/totally-tanker-interiors.*

(Continued)

*Primary Examiner* — Nathan Erb
(74) *Attorney, Agent, or Firm* — Faegre Drinker Biddle & Reath LLP

(57) ABSTRACT

Transport scheduling and transport processes for low microbial ("LM") bulk products are described. The transport scheduling and processes facilitate low microbial activity in a LM bulk product during the transport of the LM bulk product.

15 Claims, 22 Drawing Sheets

(56) References Cited

U.S. PATENT DOCUMENTS

| | | | |
|---|---|---|---|
| 3,554,772 | A | 1/1971 | Hankinson et al. |
| 3,585,047 | A | 6/1971 | Arai et al. |
| 3,730,728 | A | 5/1973 | Patashnik et al. |
| 3,796,807 | A | 3/1974 | Whelan |
| 3,869,558 | A | 3/1975 | Gallo et al. |
| 3,871,824 | A * | 3/1975 | Rechtsteiner ............. A61L 2/18 422/28 |
| 3,974,298 | A | 8/1976 | Cauvain et al. |
| 4,157,406 | A | 6/1979 | Hanamoto et al. |
| 4,259,362 | A | 3/1981 | Hanamoto et al. |
| 4,478,857 | A | 10/1984 | Stauss |
| 4,937,087 | A | 6/1990 | Bush et al. |
| 5,107,097 | A | 4/1992 | Negandhi et al. |
| 5,265,006 | A | 11/1993 | Asthana et al. |
| 5,352,473 | A | 10/1994 | Chiqurupati et al. |
| 5,433,966 | A | 7/1995 | Wolt et al. |
| 5,753,291 | A | 5/1998 | Pederson et al. |
| 5,789,012 | A | 8/1998 | Slimak |
| 5,809,479 | A | 9/1998 | Martin et al. |
| 6,397,163 | B1 | 5/2002 | Hoyt et al. |
| 6,406,727 | B1 | 6/2002 | Hamid-Samimi et al. |
| 6,534,105 | B2 | 3/2003 | Kartchner |
| 6,784,405 | B2 | 8/2004 | Flugstad et al. |
| 7,067,822 | B2 | 6/2006 | Lyons et al. |
| 7,455,225 | B1 | 11/2008 | Hadfield et al. |
| 8,226,070 | B2 | 7/2012 | Froud |
| 8,260,726 | B2 * | 9/2012 | Mariniello ......... G06Q 10/0832 705/332 |
| 8,266,070 | B2 * | 9/2012 | Mariniello ......... G06Q 10/0832 705/332 |
| 8,412,642 | B2 * | 4/2013 | Mariniello ......... G06Q 10/0832 705/332 |
| 8,577,490 | B2 * | 11/2013 | Mariniello ......... G06Q 10/0832 700/113 |
| 8,577,491 | B2 * | 11/2013 | Mariniello ......... G06Q 10/0832 700/113 |
| 8,577,492 | B2 * | 11/2013 | Mariniello ......... G06Q 10/0832 700/113 |
| 8,808,773 | B2 | 8/2014 | Weaver et al. |
| 10,213,811 | B2 * | 2/2019 | Marinello ......... G06Q 10/0832 |
| 2002/0122850 | A1 | 9/2002 | Kartchner |
| 2003/0033057 | A1 | 2/2003 | Kallestad |
| 2003/0046133 | A1 | 3/2003 | Morley et al. |
| 2003/0171943 | A1 | 9/2003 | Stockard |
| 2004/0045623 | A1 * | 3/2004 | Parker, III ............. G06Q 10/08 141/1 |
| 2004/0243353 | A1 | 12/2004 | Aghassipour |
| 2004/0260587 | A1 | 12/2004 | Vanduyne |
| 2006/0013927 | A1 | 1/2006 | Geveke et al. |
| 2006/0013932 | A1 | 1/2006 | Ljungstrom |
| 2006/0100893 | A1 | 5/2006 | Cunningham et al. |
| 2006/0117977 | A1 | 6/2006 | Vestman et al. |
| 2006/0192041 | A1 * | 8/2006 | Affleck ................ A01C 15/003 241/34 |
| 2006/0251792 | A1 | 11/2006 | Shariff et al. |
| 2007/0212472 | A1 | 9/2007 | Holenstein et al. |
| 2008/0033598 | A1 | 2/2008 | Hollingsworth et al. |
| 2008/0228514 | A1 | 9/2008 | Robinson et al. |
| 2008/0230606 | A1 * | 9/2008 | Thompson .............. E05B 39/00 235/385 |
| 2008/0319807 | A1 | 12/2008 | Weiss |
| 2010/0092639 | A1 | 4/2010 | Upreti et al. |
| 2010/0143560 | A1 * | 6/2010 | Burmester ............. A23G 9/285 426/516 |
| 2011/0030567 | A1 | 2/2011 | Turatti |
| 2011/0307288 | A1 * | 12/2011 | Mariniello ......... G06Q 10/0832 705/7.21 |
| 2012/0101615 | A1 * | 4/2012 | Mariniello ......... G06Q 10/0832 700/100 |
| 2013/0146092 | A1 * | 6/2013 | Mariniello ......... G06Q 10/0832 134/18 |
| 2015/0050397 | A1 | 2/2015 | Weaver et al. |
| 2016/0206136 | A1 * | 7/2016 | Storek .................... A47J 36/14 |
| 2019/0134678 | A1 * | 5/2019 | Mariniello ......... G06Q 10/0832 |

FOREIGN PATENT DOCUMENTS

| | | | |
|---|---|---|---|
| EP | 1079694 | B1 | 3/2001 |
| JP | 07-008830 | A | 1/1995 |
| JP | 07-115944 | B2 | 12/1995 |
| JP | 08-308911 | A | 11/1996 |
| JP | 11-248351 | A | 9/1999 |
| JP | 2000-024091 | A | 1/2000 |
| JP | 2000-135273 | A | 5/2000 |
| JP | 2001-352955 | A | 12/2001 |
| JP | 2001344317 | A | 12/2001 |
| JP | 2004018121 | A | 1/2004 |
| JP | 2005-288367 | A | 10/2005 |
| JP | 2005-333955 | A | 12/2005 |
| JP | 2006-166805 | A | 6/2006 |
| JP | 2006-304798 | A | 11/2006 |
| JP | 2006-334324 | A | 12/2006 |
| JP | 2007-097495 | A | 4/2007 |
| KR | 20030063010 | A | 7/2003 |
| WO | 95/17098 | A1 | 6/1995 |
| WO | 97/38734 | A1 | 10/1997 |
| WO | 99/59418 | A1 | 11/1999 |
| WO | 01/54519 | A1 | 8/2001 |
| WO | 2008022987 | A1 | 2/2008 |
| WO | 2009/145198 | A1 | 12/2009 |
| WO | 2011/091156 | A2 | 7/2011 |

OTHER PUBLICATIONS

"Guidance for Industry: Guidance on Bulk Transport of Juice Concentrates and Certain Shelf-Stable Juices; Final Guidance," U.S. Department of Health and Human Services, Apr. 24, 2003, (available at: http://www.fda.gov/Food/GuidanceComplianceRegulatoryinformation/GuidanceDocuments/Juice/ucm072621.htm).

"Safe Food is Good Business," Minnesota Department of Health, retrieved on Jun. 27, 2007, available at <https://web.archive.org/web/20070625054618/http://health.state.mn.us/divs/eh/food/fs/safesan.html>.

AbsorboPak.com (retrieved Sep. 17, 2008, available at: http://web.archive.Org/web/20080917222808/http://www.absorbopak.com, 3 pages.

Biegel, Bonnie "Strengthening the Food Transport Chain". AIB Food Safety, Aug. 30, 2007 <http://www.qualityassurancemag.com/Article.aspx?article_id=101474>.

Davis, Mary, "Totally Tanker Interiors," Bulk Transporter, Mar. 1, 2006 <http://bulktransporter.com/archive/totally-tanker-interiors.

FDA OTC ingredient list (alphabetical by ingredient) published Apr. 7, 2010 at http://www.fda.gov/downloads/AboutFDA/CentersOffices/OfficeofMedicalProductsandTobasco/CDER/UCM135688.pdf, 44 pages.

HazardAnalysisCriticalContro.pdf from US Food & Drug Administration (http://www.fda.gov/Food/FoodSafety/HazardAnalysisCriticalControlPointsHACCP/default/htm, 6 pages.

International Preliminary Report on Patentability dated Jul. 24, 2012 for PCT/US2011/021896, 5 pages.

International Search Report and Written Opinion dated Oct. 18, 2011 for PCT/US2011/021896, 7 pages.

International Search Report and Written Opinion dated Sep. 21, 2011 for PCT/US2011/021898, 8 pages.

Keener. "Transportation: The Squeaky Wheel of the Food Safety System," Food Safety Magazine, Oct./Nov. 2003, 5 pages.

Klimek et al., "Factors Influencing the Rate of Killing of *Escherichia coli* Exposed to Benzalkonium Chloride," Appl Microbiol. Jan. 1956, 4(1): 53-59.

Notice of Allowance dated Jul. 25, 2013 for U.S. Appl. No. 13/343,462.

Notice of Allowance dated Dec. 17, 2012 for U.S. Appl. No. 13/010,511.

Notice of Allowance dated Jul. 10, 2012 for U.S. Appl. No. 13/010,480.

Notice of Allowance dated Jul. 12, 2012 for U.S. Appl. No. 13/010,458.

(56) References Cited

OTHER PUBLICATIONS

Notice of Allowance dated Jul. 19, 2013 for U.S. Appl. No. 13/010,435.
Office Action dated Jan. 11, 2012 for U.S. Appl. No. 13/010,435.
Office Action dated Jan. 26, 2012 for U.S. Appl. No. 13/343,462.
Office Action dated Nov. 26, 2012 for U.S. Appl. No. 13/343,498.
Office Action dated Feb. 22, 20122 for U.S. Appl. No. 13/343,498.
Office Action dated Feb. 27, 2012 for U.S. Appl. No. 13/010,480.
Office Action dated Mar. 22, 2012 for U.S. Appl. No. 13/010,511.
Office Action dated Mar. 5, 2012 for U.S. Appl. No. 13/010,458.
Office Action dated May 4, 2012 for U.S. Appl. No. 13/010,435.
Office Action dated May 8, 2012 for U.S. Appl. No. 13/343,462.
Office Action dated Jul. 16, 2012 for U.S. Appl. No. 13/343,498.
Office Action dated Jul. 24, 2012 for U.S. Appl. No. 13/010,511.
Steamship Mutual, "The Problem of Sweat," RA 06, Dec. 2009, availalbe at http://www.simsl.com/Risk-Alerts/RA06ProblemofSweat.pdf, 1 page.
U.S. Official Action dated Jul. 17, 2013, in U.S. Appl. No. 13/343,498—Notice of Allowance.
U.S. Official Action dated Jul. 19, 2013, in U.S. Appl. No. 13/010,435—Notice of Allowance.
U.S. Official Action dated Jul. 25, 2013, in U.S. Appl. No. 13/343,462—Notice of Allowance.
Warchalewski et al., "Influence of Microwave Heating on Biological Activities and Electrophoretic Pattern of Albumin Fraction of Wheat Grain," Cereal Chem., vol. 87, No. 1, 2010, pp. 35-41.
Extended European Search Report issued in European Application No. 11735187.4, dated Dec. 14, 2015, 8 pages.
Guidance for Industry: A Notice from the Food and Drug Administration to Growers, Food Manufacturers, Food Warehouse Managers, and Transporters of Food Products on Decontamination of Transport Vehicles, Oct. 7, 2005, http://www.fda.gov/Food/FoodDefense/Emergencies/FloodsHurricanesPowerOuta- ges/ucm112728.htm.
International Preliminary Report on Patentability received for PCT Patent Application No. PCT/US2011/021896, dated Aug. 2, 2012, 6 pages.
Lagunas-Solar, Manuel C., et. al. Disinfection of Fishmeal with Radiofrequency Heating for Improved Quality and Energy Efficiency. Journal of the Science of Food and Agriculture, 85:2273-2280, 2005.
U.S. Official Action dated May 4, 2012 in U.S. Appl. No. 13/343,435.

\* cited by examiner

TRANSPORT SCHEDULING FOR LOW MICROBIAL BULK PRODUCTS

RELATED APPLICATIONS

The present application is a continuation of U.S. patent application Ser. No. 13/741,882 filed Jan. 15, 2013, entitled TRANSPORT SCHEDULING FOR LOW MICROBIAL BULK PRODUCTS, which is a continuation of U.S. patent application Ser. No. 13/010,511 filed Jan. 20, 2011, now issued as U.S. Pat. No. 8,412,642, entitled TRANSPORT SCHEDULING FOR LOW MICROBIAL BULK PRODUCTS, which claims the benefit of U.S. Provisional Application Ser. No. 61/354,962 filed Jun. 15, 2010 entitled TRANSPORT SCHEDULING FOR LOW MICROBIAL BULK PRODUCTS. The above mentioned applications are incorporated herein in their entirety.

BACKGROUND

Products can be manufactured by a supplier for transport to a customer. Many times, a vehicular transport moves the product from the supplier to the customer. For many product types, transportation can have a negative affect on the quality of the product received by the customer. For example, a product at a supplier load-out facility can have a particular quality. This quality can be adversely affected during transport to result in an inferior quality product being received by the customer.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of this disclosure pertain to transport scheduling and transport processes for low microbial ("LM") bulk products. The transport scheduling and processes facilitate low microbial activity in a LM bulk product during the transport of the LM bulk product.

DRAWINGS

DETAILED DESCRIPTION

Figure 1:
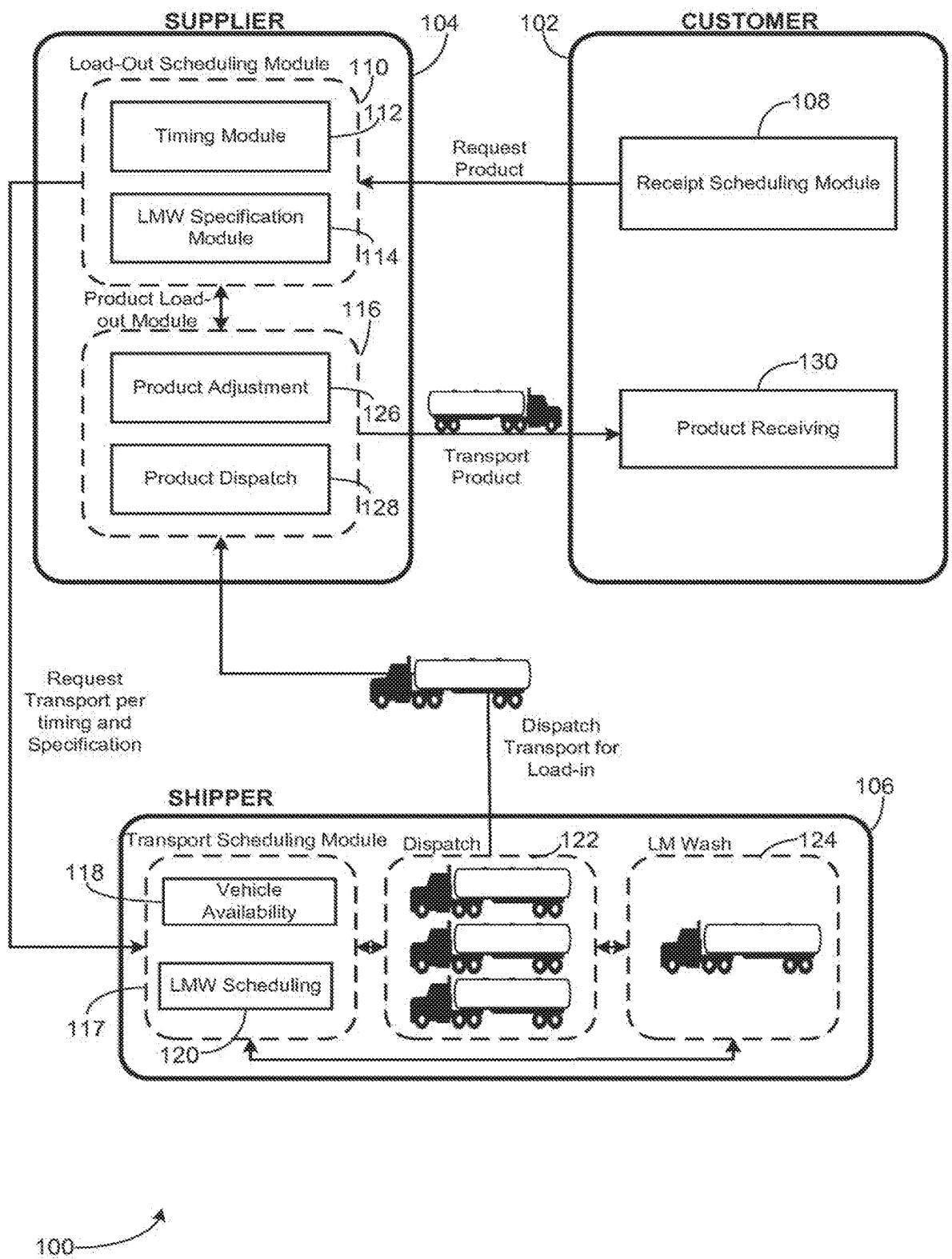
FIG. 1 is an example system diagram illustrating an example system for transport scheduling for low microbial bulk products.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as methods, processes and/or devices. The following detailed description is, therefore, not to be taken in a limiting sense.

Low Microbial ("LM") bulk products can be produced from a variety of raw materials. The disclosure herein utilizes several examples associated with flour. Yet, this disclosure is not limited to such a product. LM bulk products can include, for example, flour of all types, bran, germ, grains, oats, wheat, rye, barley and the like. It is further contemplated that LM bulk products that utilize the processes herein can include various ingredient types, sugars, spices and such. It is also contemplated that LM bulk products that utilize the processes herein can include products that are first dehydrated and then milled or ground such as peppers, vegetables, fruits and the like.

LM bulk products have a plurality of uses in the cooking industry. As an example associated with flour, flour can be utilized by a consumer for baking on a micro level. In such a situation, relatively small packages of flour can be obtained by the consumer for baking. For example, a consumer can purchase a small package of flour for baking a small batch of cookies at home. Flour can also be utilized by large food companies as an ingredient in an end product. In such a situation, large quantities of flour can be required for normal activities of the food company. For example, a food company can purchase thousands of pounds of flour to produce large quantities of cookie dough that an end consumer would ultimately bake. Many times the flour is ultimately cooked prior to consumption. For example, a consumer can bake the cookie dough prior to consuming a baked cookie. However, in many situations, a consumer may consume the flour prior to being cooked. For example, a consumer may consume cookie dough in a raw form prior to cooking the dough. Yet, raw flour can include microbial activity. The risk of microbial activity can stem from uncertainty in microbial reduction when the flour is processed. The risk of microbial activity can also stem from contamination and microbial growth during transport of the flour. As more fully set forth below, aspects of the disclosure pertain to transport scheduling and transport processes that provide a level of confidence related to the reduction of microbial activity. As such, a low microbial bulk product can be shipped and received by a consumer company in bulk and can be consumed in a raw form.

Low microbial ("LM") bulk products and processes for manufacturing LM bulk products are more fully set forth in provisional patent application 61/296,477. Aspects of this disclosure pertain to transport scheduling and transport processes for LM bulk products where the sterile integrity of the LM bulk product is maintained during shipping.

As an example of such scheduling, a customer can send a request to a supplier for a shipment of a LM bulk product. The request can include a receipt date for receiving the shipment at the customer's facility. A load-out date can also be determined. For example, if the receipt date indicates reception on May 2nd at 8:00 a.m., the load-out date may need to be May 1st at 8:00 a.m. to ensure that the shipment arrives at the customer's facility by the receipt date. A vehicle transport period can be determined based on the load-out date and the receipt date. For example, the vehicle transport period can include the date from vehicle dispatch until the product is received at the customer's facility and unloaded from the vehicle. A product transport period can also be determined based on the load-out date and the receipt date. For example, the product transport period can include the date from product dispatch at the supplier until the product is received at the customer's facility and unloaded from the vehicle.

A LM wash specification can also be obtained and/or determined. The LM wash specification can include a low microbial wash (LMW) process as indicated below and a LMW timing threshold. When a transport request is received, the LMW records for one or more vehicles can be accessed. The LMW timing threshold is compared to the LMW record for a vehicle to determine whether the LMW record of the vehicle exceeds the LMW timing threshold for the vehicle transport period.

When it is determined that the LMW record does not exceed the LMW timing threshold for the vehicle transport period, the vehicle can qualify for dispatch to transport the shipment. When it is determined that the LMW record exceeds the LMW timing threshold for the vehicle transport period, the vehicle does not qualify for dispatch and can be subjected to a LM wash process prior to being dispatched to transport the shipment.

The LM bulk product can be scheduled for adjustment at a product load-out operation. Attributes of the LM bulk product, such as temperature and moisture content, can be adjusted to account for the product transport period and environmental conditions during the product transport period. For example, a product transport period can be from May 1st at 8:00 am (product load-out at supplier) until May 2nd at 8:00 am (receipt at customer's facility). The projected transport conditions between the supplier and the customer can indicate high temperature and high humidity during the product transport period on the path between the supplier and the customer. Accordingly, the temperature and moisture content of the LM bulk product can be adjusted to account for the projected transport conditions prior to load-out into the transport vehicle.

In light of such scheduling, microbial activity in the LM bulk product is controlled during the transport of the LM bulk product. The control of the activity results in a product that has a high confidence level of reduced microbial activity upon reception at the customer's facility.

A. System

Figure 2:
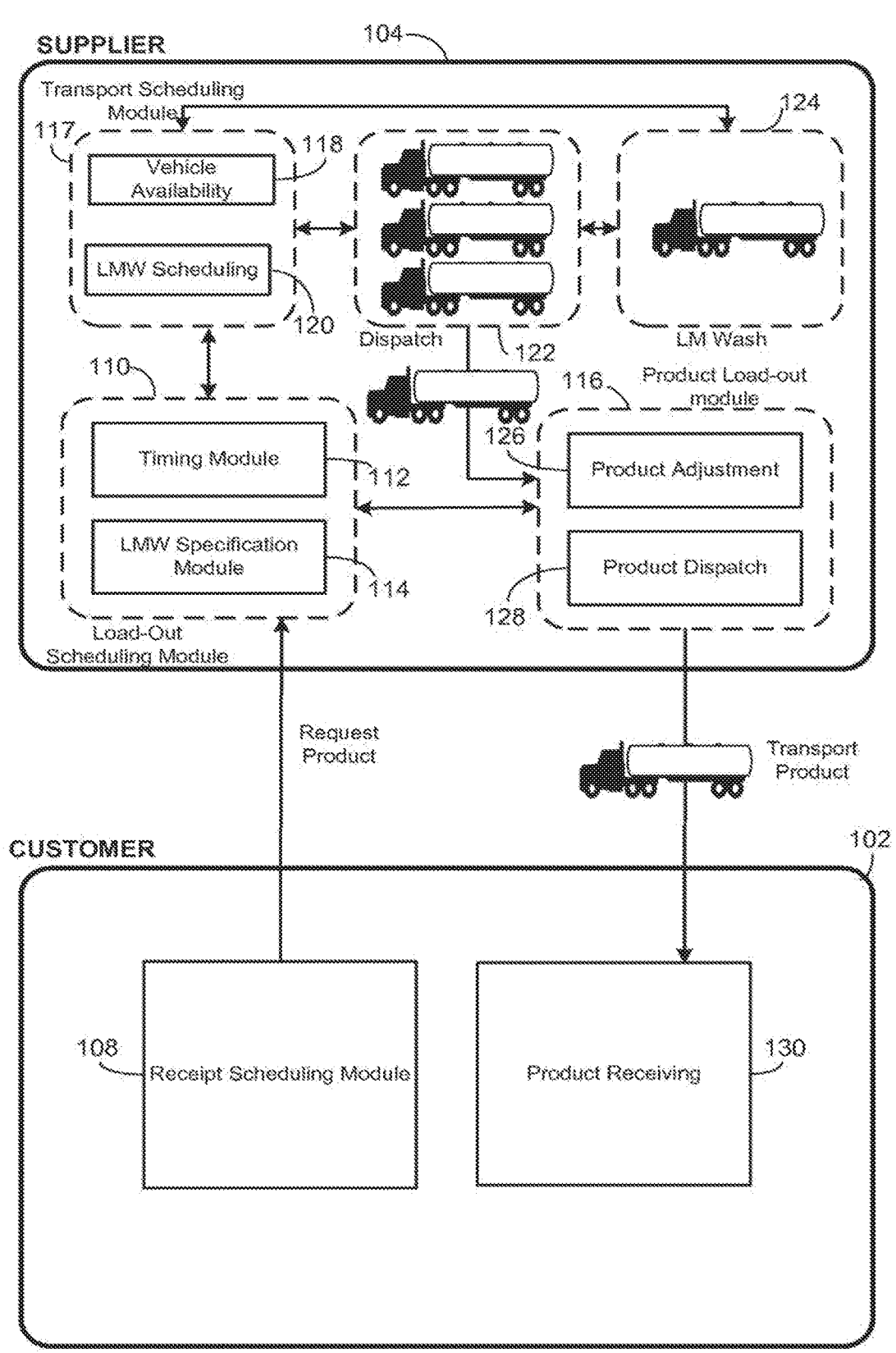
FIG. 2 is an example system diagram illustrating an example system for transport scheduling for low microbial bulk products.
Figure 3:
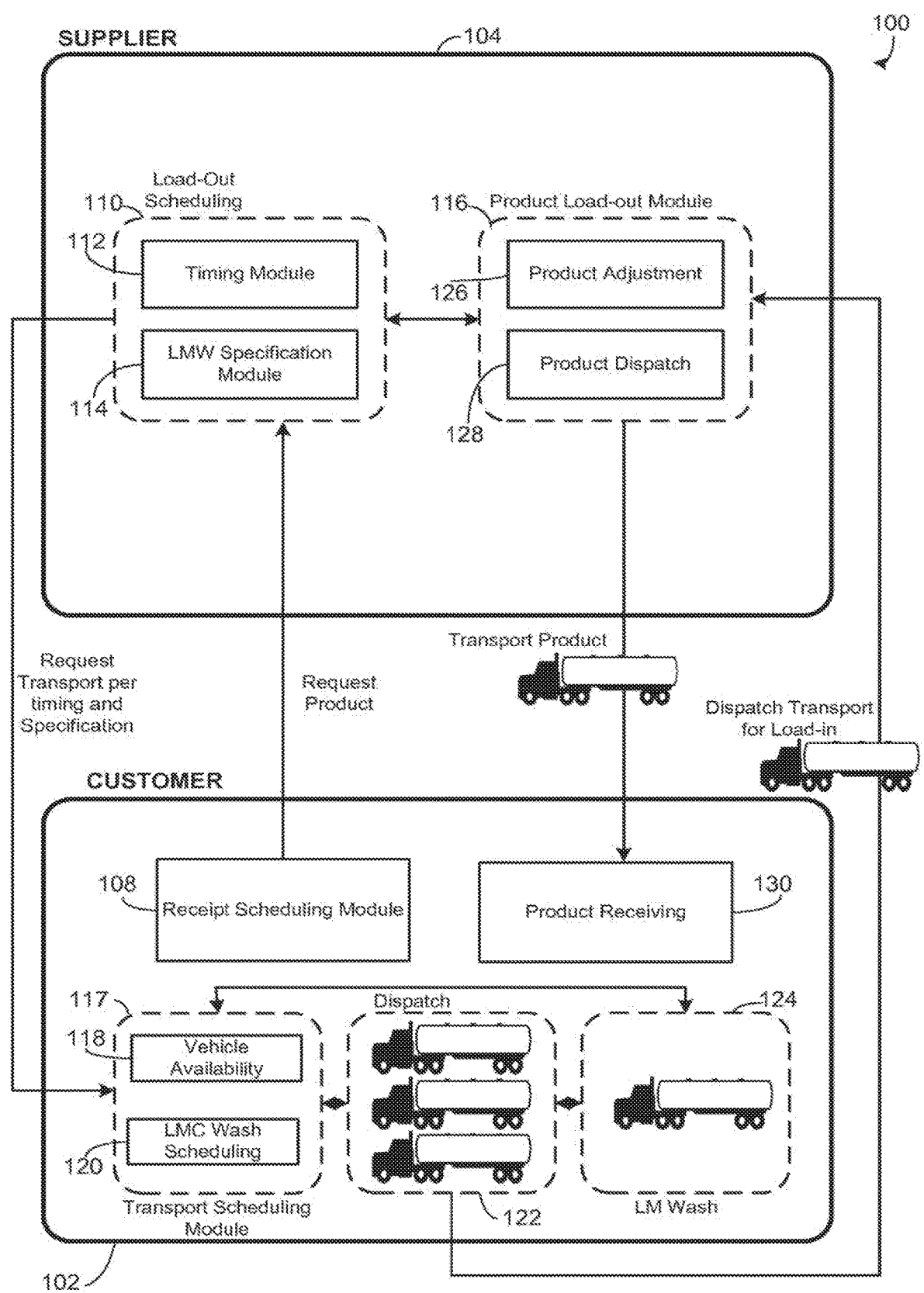
FIG. 3 is an example system diagram illustrating an example system for transport scheduling for low microbial bulk products.

FIG. 1 represents one example system 100 for transport scheduling of LM bulk products. FIG. 1 indicates an example system 100 that includes a third party shipper. Yet, as indicated in FIGS. 2 and 3, the entities related to the system can be related in a plurality of ways. For example, in FIG. 2 a shipping entity is a division of the supplier. As another example, in FIG. 3, the shipping entity is a division of the customer. Various combinations and sub-combinations of the systems indicated in FIGS. 1-3 are fully contemplated. FIG. 1 is more fully described below. Yet, the discussion related to FIG. 1 can also be related to FIGS. 2 and 3 as will be evident as more fully set forth herein.

System 100 represents a system overview. System 100 can include various configurations without departing from the functionality set forth in this description. The elements and functionality described can be integrated into the system as single elements and/or combination elements that include multiple functionalities. For example, various elements and arrows between elements are depicted for purposes of explaining aspects of functionality and not necessarily for indicating where the elements structurally "reside" or that the elements are single entities or multiple entities. For example, FIGS. 1-3 indicate a customer 102, supplier 104, and shipper 106. Elements associated with customer 102, supplier 104, and shipper 106 can reside anywhere within the system. For example, elements can reside on a third party network system. Elements can further reside on a computing device mounted to a transport vehicle. It is contemplated that the elements can include combinations performing multiple functions and/or single entities performing a single function. It is further contemplated that the elements can be located in a myriad of facility locations depending on desire, processing efficiencies, economics, etc. The categorized and named elements are merely for facilitating a logical flow of the description of system 100 as set forth herein.

Figure 21:
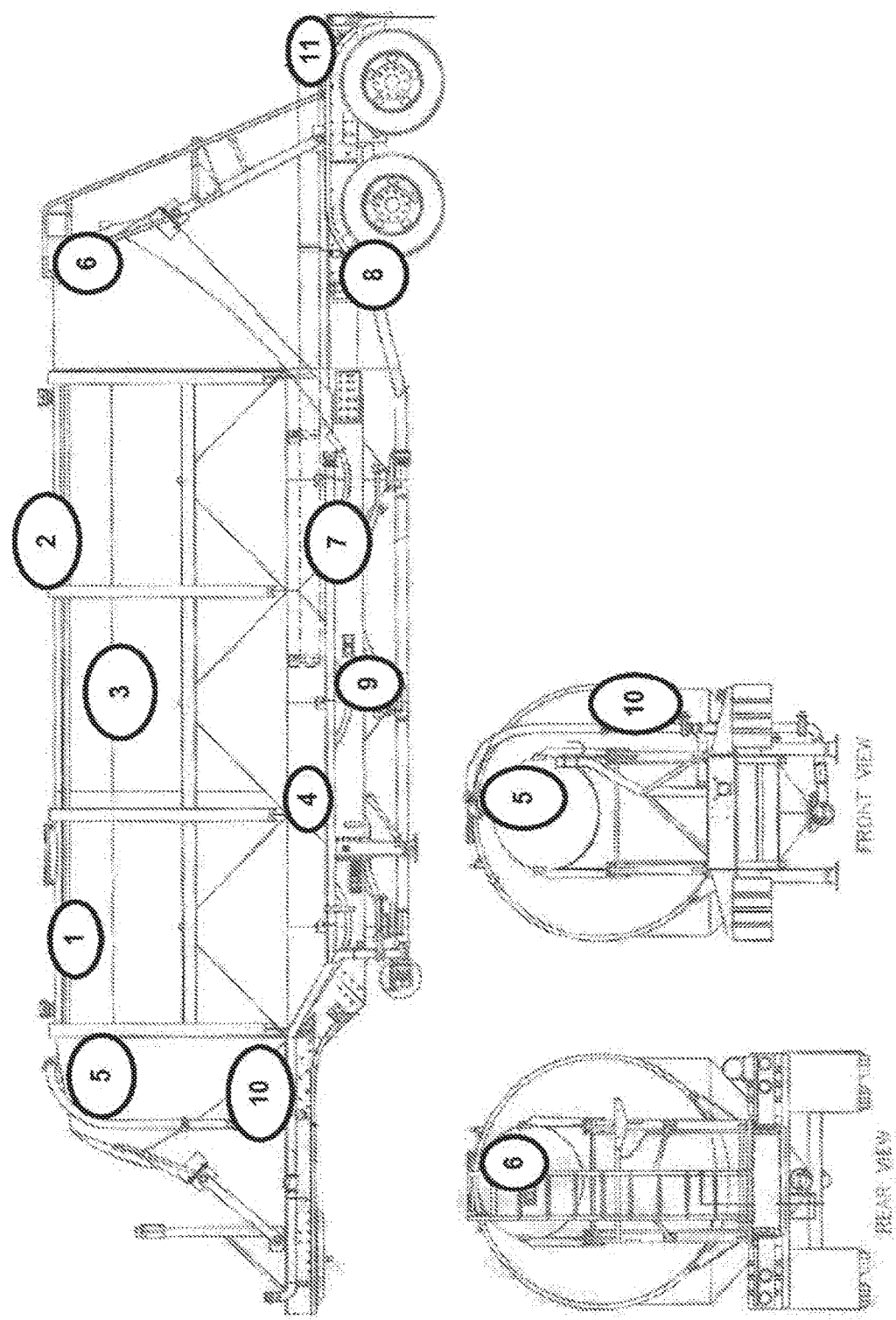
FIG. 21 is an exemplary diagram illustrating swab points utilized during microbial testing of a transport vehicle.

As indicated below, the disclosure indicates a transport vehicle. The transport vehicle can be a vehicle that includes a vessel with one or more hoppers for holding bulk products. As an example, the vessel can be a vessel as indicated in FIG. 21 for transporting bulk dry products such as flour. The vessel can include a plurality of vessel accessibility components. The vessel accessibility components can be components associated with the vessel that can harbor microbial growth that can affect the product maintained in the vessel. For example, vessel accessibility components can include removable and non-removable components that facilitate access to the vessel. For example, the facilitated access can be product access, forced air access and/or operator access. As a general example, vessel accessibility components can include valves, caps, gaskets, lids, product lines, screens and/or storage compartments for the vessel accessibility components.

A vessel accessibility component can include one or more hatch lids and one or more hatch lid gaskets. The hatch lids can be the covering that encloses the man holes that make the interior of the vessel accessible. Vessel accessibility components can also include unloading lines, unloading line caps and unloading line gaskets. Vessel accessibility components can further include pressure relief valves and pressure relief valve gaskets. The pressure relief valve can be a detachable device that allows excessive pressure to release from the vessel. Vessel accessibility components can also include aerator lines and aerator line gaskets. Vessel accessibility components can further include product hoses and product hose gaskets. The product hose can be a detachable hose that is used to unload bulk product from the vessel by joining the product line to a bin port. The product line is the bottom line or plumbing that runs the length of the trailer and connects to product hoppers. Vessel accessibility components can also include in-line unloading screens. In other aspects, vessel accessibility components can include hopper swing away tees. The hopper swing away tees can be a T-shaped connector that joins the bottom of the product hopper to the product line. Vessel accessibility components can also include a screen storage box. The screen storage box can be a fabricated box with a hinge lid that is mounted to the exterior of the vehicle. The screen storage box can store the in-line unloading screen. The in-line unloading screen can be a detachable device that connects to the end of the product hose and helps to eliminate foreign materials from passing into an unloading bin. Even though the vehicle is indicated herein as a road vehicle, it is contemplated that the vessel can be transported by rail, water and/or air without departing from the disclosure herein.

Figure 4:
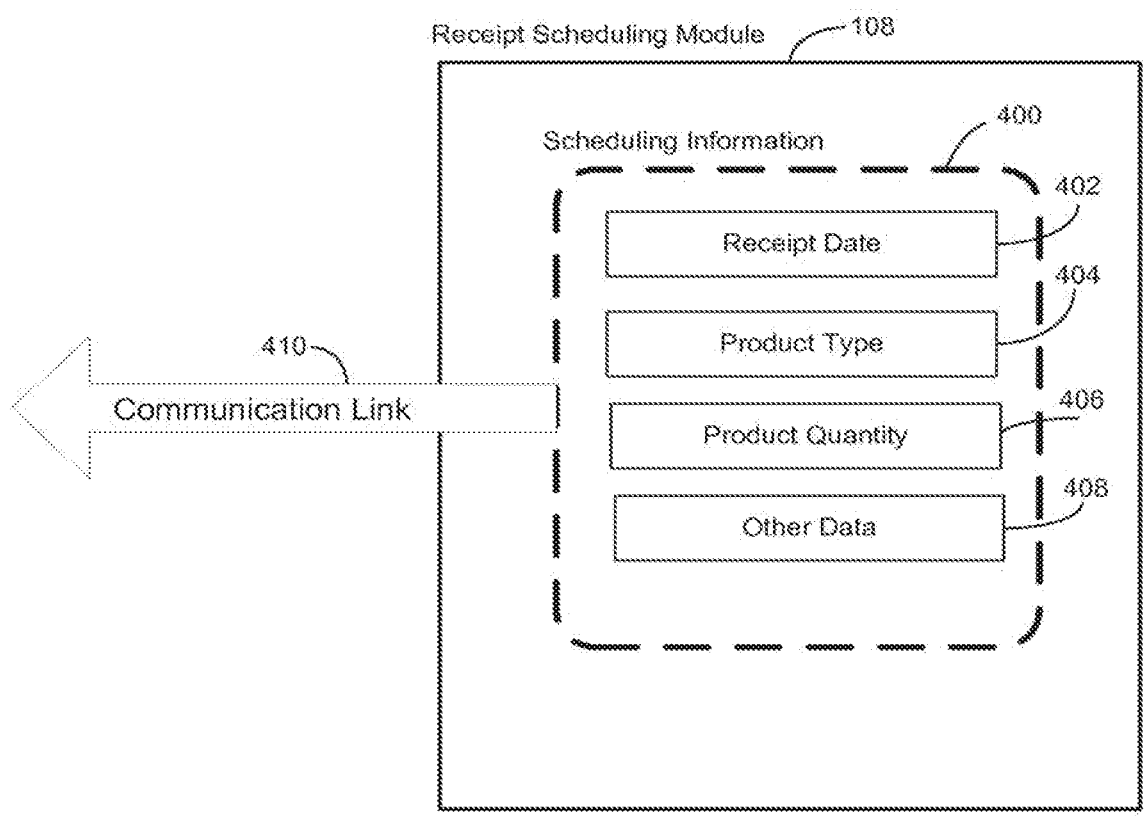
FIG. 4 is an example system diagram illustrating an example receipt scheduling module for transport scheduling for low microbial bulk products.

As indicated in FIG. 1, system 100 includes customer 102, supplier 104 and shipper 106. As indicated above and in FIGS. 1-3, the elements can have various relationships to one another. Customer 102 can include receipt scheduling module 108. The receipt scheduling module 108 can include a computing device, a telecommunications device and the like. In one aspect, receipt scheduling module 108 can include aspects of computing device 2200 indicated in FIG. 22. As indicated in FIG. 4, receipt scheduling module 108 obtains receipt scheduling information 400. Receipt scheduling information 400 can include receipt date 402, product type 404, product quantity 406, other date 406 and/or related scheduling information. Scheduling information 400 is communicated to load-out scheduling module 110 of supplier 104 via communication link 410. The communication can be associated with a telephonic communication, an electronic message communication, a communication facility by a collaborative network based interface and/or the like.

Load-out scheduling module 110 can include a computing device, a telecommunications device and the like. In one aspect, load-out scheduling module 110 can include aspects of computing device 2200 indicated in FIG. 22. Load-out scheduling module 110 can obtain scheduling information 400 from receipt scheduling module 108 as indicated above.

Figure 5:
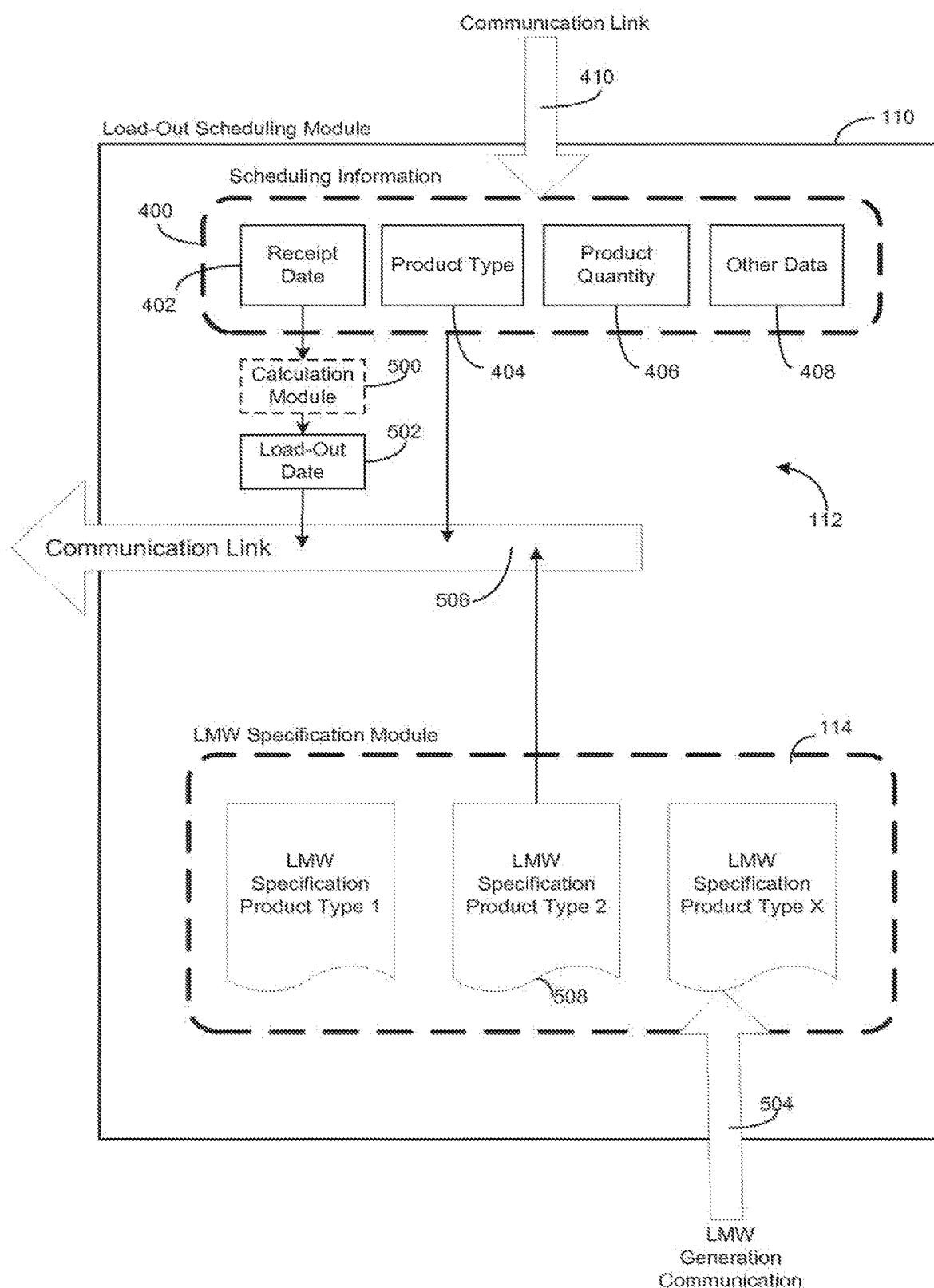
FIG. 5 is an example system diagram illustrating an example load-out scheduling module for transport scheduling for low microbial bulk products.

Load-out scheduling module 100 can include a timing module 112 and LMW specification module 114. With reference to FIG. 5, timing module 112 can include calculation module 500 for calculating load-out date 502 based on receipt date 402 obtained from receipt scheduling module 108. For example, if an obtained receipt date 402 is May 2nd, load-out date 502 can be calculated as May 1st to account for the product transport period. LMW specification module 114 can include a database and/or storage device that maintains LMW specifications for a plurality of product types. Product type 404 obtained from the receipt scheduling module 108 can be utilized as a value to determine a stored LMW specification for product type 404. In other aspects, the LMW specification can be obtained from customer 102. In still other aspects, the LMW specification can be generated and obtained via a LMW generation communication 504.

The LMW specification can include information related to a LMW process and a value indicating a LMW timing threshold. The LMW timing threshold can be based on a microbial baseline. The baseline can be generated from a comparison between microbial levels of the product prior to load out and microbial levels at one or more swab points of a vehicle over time. When the microbial levels of the one or more swab points are greater than a threshold in relation to the product prior to load-out, the LMW timing threshold can be set for the LMW specification. As an example, the microbial level of a product prior to load-out can be X colonies. The product can be loaded into a vessel that has just been washed according to the procedures indicated in the specification. After being received, the vessel can be swabbed as indicated below. The microbial count of the swabs may indicate that the microbial threshold has not been exceeded in relation to the X colonies. In one example, the microbial threshold can be a one logarithmic increase in microbial colonies. Accordingly, the vehicle may make further shipments of the product until the microbial threshold has been exceeded in reference to the X colonies. The microbial baseline thus indicates that that the LMW timing threshold should be less than the time between the microbial wash and the time with the microbial threshold was exceeded. The time indicated by the baseline can depend on the product type, the transport timing, the environment during the transport period, the temperature and humidity during the transport period, and temperature and humidity variations during the transport period. Once the LMW timing threshold has been determined from the baseline, the LMW timing threshold can be implemented with the specification and applied to future transportation scheduling.

Load-out scheduling module 110 can communicate with product load-out module 116 as more fully stated below via communication link 506. Load-out scheduling module 110 can also communicate with transport scheduling module 117 of shipper 106 via communication link 506. Such communication can include telephonic communication, an electronic message communication, a communication facility by a collaborative network based interface and/or the like. Load-out scheduling module 110 can request a transport per timing module 112 and LMW specification module 114 determined by load-out scheduling module 110. For example, the request can include receipt date 402, product type 404, product quantity 406, load-out date 502 and LMW specification 508 of LMW specification module 114 that is associated with the product type 404. In other aspects, shipper 106 can already have LMW specification 508. In such a situation, a respective LMW specification 508 may not need to be communicated to shipper 106.

Transport scheduling module 117 can include a computing device, a telecommunications device and the like. In one aspect, transport scheduling module 117 can include aspects of computing device 2200 indicated in FIG. 22. Transport scheduling module 117 can obtain scheduling information from load-out scheduling module 110 via communication link 506. The scheduling information can include LMW specification 508 (in the situation where the LMW specification is not already available to transport scheduling module 117), receipt date 402, load-out date 502, product type 404, product quantity 406, other date 408 and/or other information associated with product scheduling. Transport scheduling module 117 can include vehicle availability module 118 and LMW scheduling module 120.

Figure 6:
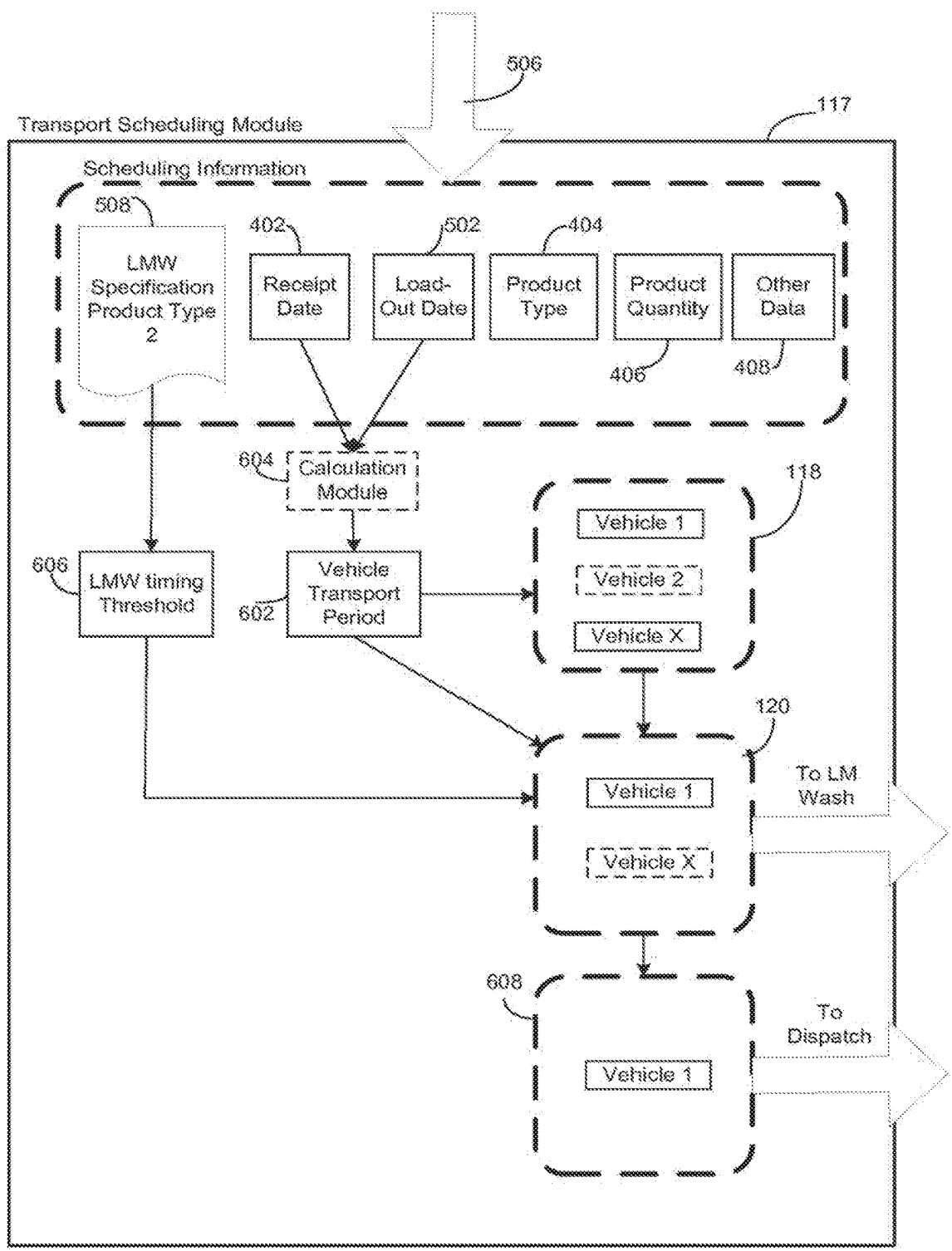
FIG. 6 is an example system diagram illustrating an example transport scheduling module for transport scheduling for low microbial bulk products.

In reference to FIG. 6, vehicle availability module 118 can maintain a dispatch schedule for a plurality of vehicles. For example, a dispatch schedule can maintain a history of prior dispatches for vehicles, a current dispatch schedule for the vehicles and future dispatch schedules for vehicles. Such schedules can include dates, times, locations and/or the like associated with product shipments. LMW scheduling module 120 can maintain LMW records associated with the vehicles. For example, LMW scheduling module 120 can maintain values and records associated with prior LMW procedures on a vehicle, current LMW procedures on a vehicle and/or schedule LMW procedures for a vehicle.

As indicated above, transport scheduling module 117 has access to the scheduling information. Vehicle transport period 602 can be calculated for the vehicles via calculation module 604. Vehicle transport period 602 can be a calculated period from dispatch 122 until product receipt at customer 102. Vehicle transport period 602 can be partially based on the receipt date 402 and the load-out date 502 received from load-out scheduling module 110 via communication link 506.

The calculated vehicle transport period 602 can be utilized by vehicle availability module 118 to determine potential vehicles for the product shipment. For example, if a vehicle is scheduled for another dispatch during vehicle transport period 602, it may not be considered a potential vehicle for the product shipment. LMW records for the potential vehicles can then be obtained from a database of such records associated with LMW scheduling module 120. The LMW records can be compared to calculated vehicle transport period 602 and LMW timing threshold 606 to determine vehicles that can qualify for the product shipment.

When it is determined that the LMW record does not exceed LMW timing threshold 606 for the vehicle transport period 602, the vehicle can be indicated in qualification queue 608 for dispatch to transport the shipment. When it is determined that the LMW record exceeds LMW timing threshold 606 for vehicle transport period 602, the vehicle may not currently qualify for dispatch and can be subjected to a LM wash process prior to being dispatched to transport the shipment. For example, a vehicle transport period can be from May 1st at 5:00 am (vehicle dispatch) until May 2nd at 8:00 am (receipt at customer's facility). The LM wash record for a vehicle may indicate that the vehicle was subjected to a LMW process on April 29th at 8:00 am. The duration between April 29th at 8:00 am (LMW record) and May 2nd at 8:00 am (receipt at customer's facility) is 4 days. The 4 days is below the LMW timing threshold (7 days) for the vehicle transport period. Accordingly, the vehicle would qualify for dispatch and shipping of the LM bulk product. As another example, a vehicle transport period can be from May 1st at 5:00 am (vehicle dispatch) until May 2nd at 8:00 am (receipt at customer's facility). The LMW record for a vehicle may indicate that the vehicle was subjected to a LMW process on April 25th at 8:00 am. The duration between April 25th at 8:00 am (LMW record) and May 2nd at 8:00 am (receipt at customer's facility) is 8 days. The 8 days is greater than the LMW timing threshold (7 days) for the vehicle transport period. Accordingly, the vehicle would not qualify for dispatch unless the vehicle was subjected to the LMW process prior to dispatch.

Shipper 106 can further include a dispatch entity 122 and a LM wash 124. Dispatch entity 122 can include facilities for dispatching a vehicle in accordance with the determinations and scheduling of transport scheduling module 117. LM wash 124 can include facilities for implementing LMW processes on a vehicle according to LMW specification 508 and according to the schedule determined by transport scheduling module 117. The LMW wash process is more fully set forth below in association with FIGS. 12-19.

Figure 7:
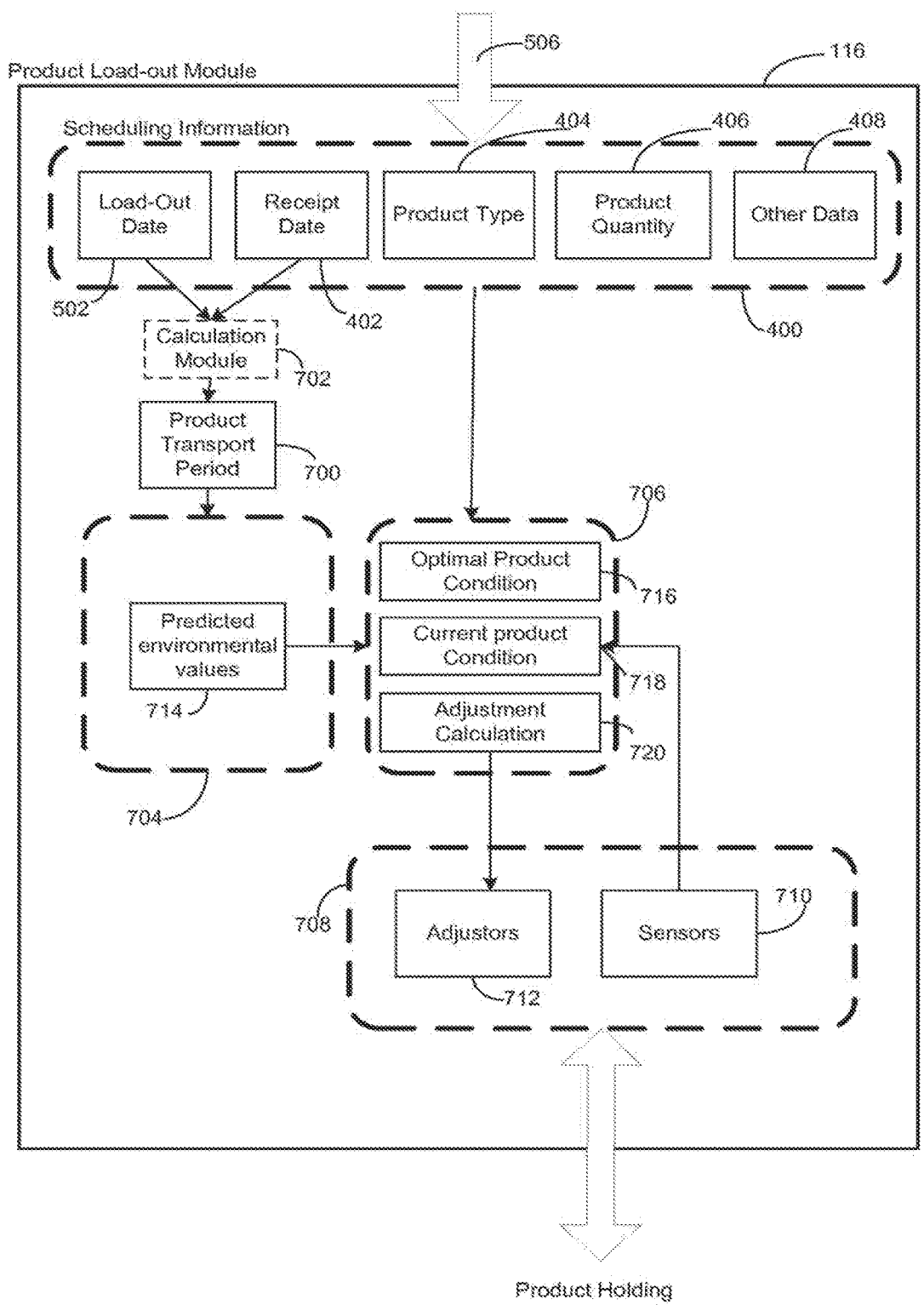
FIG. 7 is an example system diagram illustrating an example product load-out module for transport scheduling for low microbial bulk products.

After dispatch, the vehicle arrives at supplier 104. As previously indicated, load-out scheduling module 110 can communicate with product load-out module via communication link 506. Product load-out module 116 can include aspects of a computing device, monitoring devices, sensors and/or the like. In one aspect, product load-out module 116 can include aspects of computing device 2200 indicated in FIG. 22. In reference to FIG. 7, product load-out module 116 can obtain the scheduling information 400. As indicated, the scheduling information can include load-out date 502, receipt date 402, product type 404, product quantity 406, other data 408 and/or other information associated with the shipping of a product. From receipt date 402 and load-out date 502, product transport period 700 can be calculated via calculation module 702. For example, the load-out date may be May 1st at 8:00 am and the receipt date may be May 2nd at 8:00 am. Accordingly, the product transport period can be calculated as 24 hours starting at May 1st at 8:00 am.

Product load-out module 116 can include product adjustment module 126 and product dispatch module 128. Product adjustment module 126 can include a prediction module 704, adjustment calculation module 706 and device module 708.

Device module 708 can include sensors 710 such as a temperature sensor for receiving a current temperature of a product prior to load-out. Sensors 710 can also include a moisture sensor for receiving a current moisture content of a product prior to load-out. Device module 708 can further be associated with adjustors 712. Adjustors 712 can include a temperature adjustment device for heating and/or cooling the product prior to load-out. Adjustors 712 can also include a moisture adjustment device for drying and/or wetting the product prior to load-out.

Prediction module 704 can be configured to obtain predicted environmental values 714 via the internet and/or a network. As indicated, product transport period 700 and a transport path can be accessible to the prediction module 704. As such, prediction module 704 can determine a forecast for environmental conditions starting on load-out date 502 through the duration of product transport period 700 at geographic locations along the transport path.

From the values of prediction module 704, adjustment calculation module 706 can calculate optimal product condition values 716. Optimal product condition values 716 can include optimal temperature and moisture conditions for the product when navigating the transport path having the predicted environmental conditions. The optimal product conditions 706 can be compared to current product conditions 718 such as current temperature and current moisture values received from the temperature sensor and the moisture sensor, respectively. In the situation where the current temperature and the current moisture values are not optimal, adjustment calculation 720 can be generated to cause a signal to actuate the temperature adjustment device and/or the moisture adjustment device to bring the product to an optimal condition for the product transport period 700.

After load-out, the vehicle transports the product to customer 102 where it is received by product receiving facility 130. The vehicle can then return to shipper 106 or return to the supplier for another shipment subject to the above.

B. Methods and Processes

Figure 8:
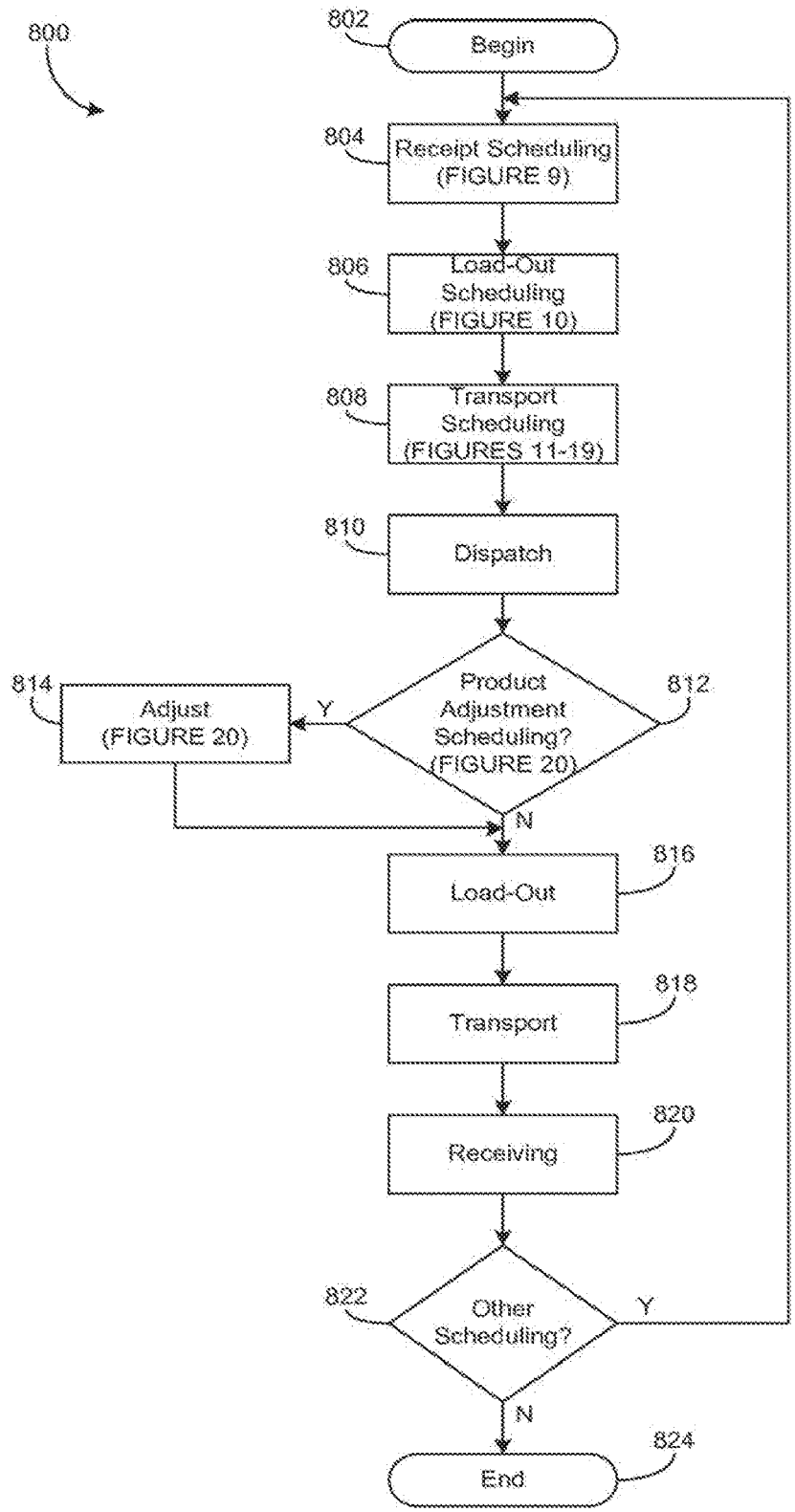
FIG. 8 is an example operational flow diagram illustrating an example process for transport scheduling of LM bulk products.

FIG. 8 is an example operational flow diagram illustrating an example process for transport scheduling of LM bulk products. Operational flow 800 starts at begin operation 802 and flows to receipt scheduling operation 804. Receipt scheduling operation 804 is more fully described in FIG. 9. From receipt scheduling operation 804, operational flow 800 continues to load-out scheduling operation 806. Load-out scheduling operation 806 is more fully described in FIG. 10. From load-out operation 806, operational flow 800 continues to transport scheduling operation 808. Transport scheduling operation 808 is more fully described in FIGS. 11-19.

From transport scheduling operation 808, operational flow 800 continues to dispatch operation 810. At dispatch operation 810, a transport vehicle can be dispatched to a supplier facility to receive a LM bulk product. From dispatch operation 810, operational flow 800 continues to decision operation 812. At decision operation 812, a decision is made as to whether product adjustment scheduling is desired. When product adjustment scheduling is desired, operational flow 800 continues to adjustment operation 814. Decision operation 812 and adjustment operation 814 are more fully described in FIG. 20.

From adjustment operation 814, operational flow 800 continues to load-out operation 816. Also, when product adjustment scheduling is not desired, operational flow 800 flows from decision operation 812 to load-out operation 816. At load-out operation 816, the LM bulk product is loaded into a transport vehicle. As an example, a stream of LM bulk product can be blown into a vessel of the transport vehicle. From load-out operation 816, operational flow 800 continues to transport operation 818 where the loaded transport vehicle is transported to a receiving facility. At receiving operation 820, the LM bulk product is unloaded from the transport vehicle. As an example, the LM bulk product can be blown from a vessel of the transport vehicle to a storage vessel of the receiving facility.

Operational flow 800 continues to decision operation 822. At decision operation 822 it is decided whether the transport vehicle is associated with other scheduling. For example, the transport vehicle can be scheduled for a subsequent shipment of a LM bulk product. In such a situation, operational flow 800 loops back to receipt scheduling operation 804. In other situations, the transport vehicle can be scheduled for a subsequent shipment of a product other than a LM bulk product. If it is determined, at decision operation 822, that the transport vehicle is not associated with other scheduling, operational flow 800 can continue to end operation 824.

Figure 9:
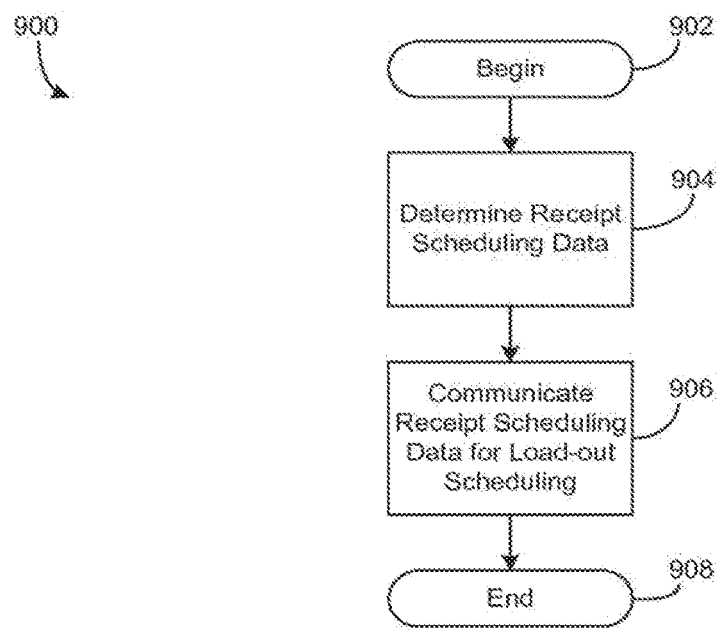
FIG. 9 is an example operational flow diagram illustrating an example process associated with receipt scheduling.

As indicated in FIG. 8, operation 804 is described in FIG. 9. FIG. 9 is an example operational flow diagram illustrating an example receipt scheduling operation that can be associated with a process for transport scheduling of LM bulk products. Operational flow 900 can start at begin operation 902 and continue to receipt scheduling data operation 904. Receipt scheduling data operation 904 can include a determination of receipt scheduling data. For example, a receipt date can be determined. A receipt date can include a date and/or time that a product is to be tendered. As another example, receipt scheduling data can include a product type to be tendered. For example, a product type can include a LM bulk flour type. As another example, receipt scheduling data can include product quantity data. For example, product quantity data can include a volume, weight, and/or other quantity of a LM bulk flour shipment. Receipt scheduling data can further include other information. For example, other information can include a receipt facility location, contacts, operators, product specifications, LM wash specifications and/or other receipt scheduling data and information.

The determination can include an automatic computer implemented determination, a computer facilitated determination based on scheduling data and/or the like. Also, the determination can be manual and facilitated by an operator. Operational flow 904 can continue to communication operation 906. At communication operation 906, the receipt scheduling data can be communicated for load-out scheduling. Such communication can be facilitated by an electronic message, can be facilitated by a scheduling program such as a Gantt based program and/or can be facilitated by a telecommunication. Such communication can also be manual and facilitated by an operator. From communication operation 906, operational flow 900 can continue to end operation 908.

Figure 10:
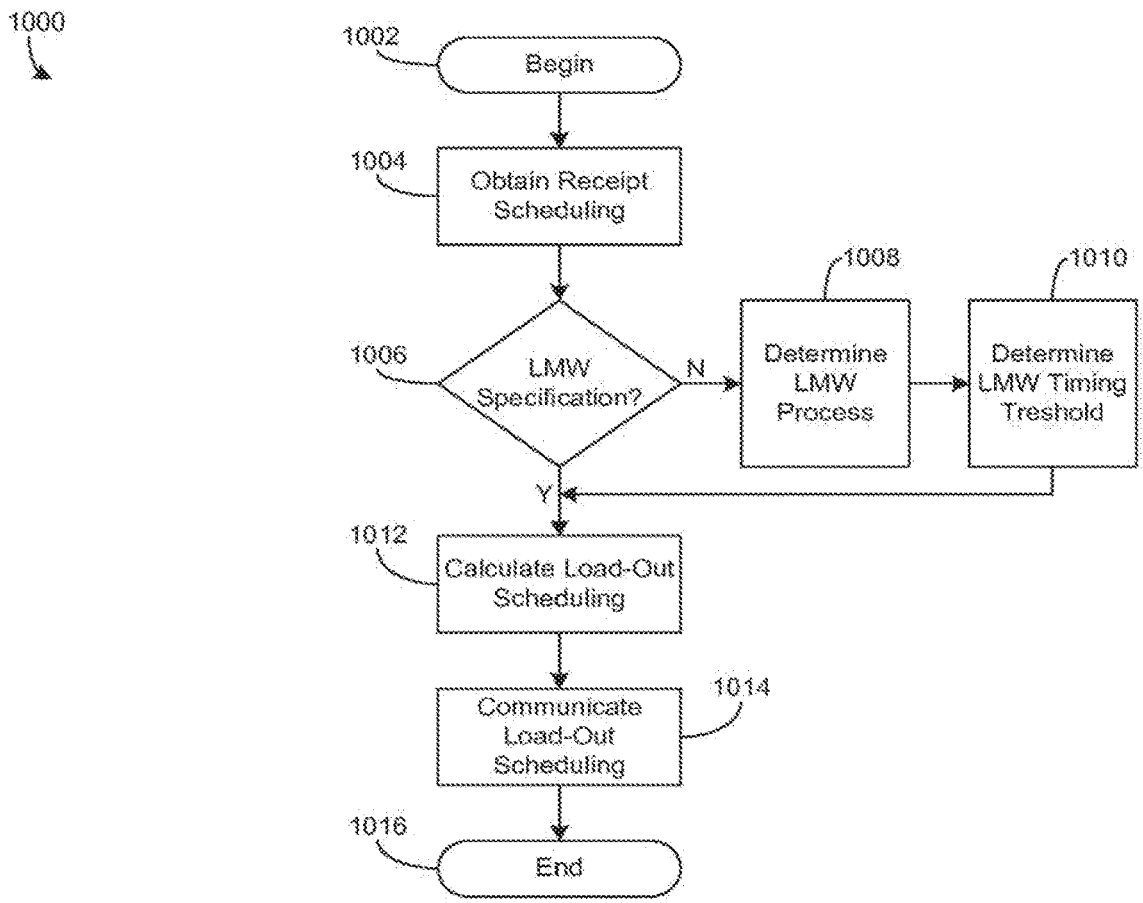
FIG. 10 is an example operational flow diagram illustrating an example process associated with load-out scheduling.

As indicated in FIG. 8, operation 806 is described in FIG. 10. FIG. 10 is an example operational flow diagram illustrating an example load-out scheduling operation that can be associated with a process for transport scheduling of LM bulk products. Operational flow 1000 starts at begin operation 1002 and continues to obtain operation 1004 where receipt scheduling is obtained. Receipt scheduling can be obtained by an electronic message, can be facilitated by a scheduling program such as a Gantt based program and/or can be facilitated by a telecommunication. Such obtainment can also be manual and facilitated by an operator.

Operational flow 1000 can continue to decision operation 1006 where it is determined whether a LMW specification exists. The determination can be facilitated by searching a database of LMW specifications for a LMW specification that matches the product type data indicated in obtained receipt scheduling data. For example, product type data can indicate a LM bulk flour type. The type can be an identifier for obtaining an LM bulk flour LMW specification from the database. In other examples, a LMW specification can be obtained with the receipt scheduling data. In still other examples, the LMW specification can be pregenerated. In the situation where LMW specification does not exist, the specification can be generated by operational flow 1000 continuing to operations 1008 and 1010. At operation 1008, a LMW process is determined. An example LMW process is indicated in FIGS. 12-19. From operation 1008, operational flow 1000 can continue to operation 1010 where a LMW timing threshold can be determined. As an example, a LMW timing threshold can be based on a microbial baseline. The baseline can be generated from a comparison between microbial levels of the product prior to load out and microbial levels at one or more swab points of a vehicle over time. When the microbial levels of the one or more swab points are greater than a threshold in relation to the product prior to load-out, the LMW timing threshold can be set for the LMW specification. As an example, the microbial level of a product prior to load-out can be X colonies. The product can be loaded into a vessel that has just been washed according to the procedures indicated in the specification. After being received, the vessel can be swabbed as indicated below. The microbial count of the swabs may indicate that the microbial threshold has not been exceeded in relation to the X colonies. In one example, the microbial threshold can be a one logarithmic increase in microbial colonies. Accordingly, the vehicle may make further shipments of the product until the microbial threshold has been exceeded in reference to the X colonies. The microbial baseline thus indicates that that the LMW timing threshold should be less than the time between the microbial wash and the time with the microbial threshold was exceeded. The time indicated by the baseline can depend on the product type, the transport timing, the environment during the transport period, the temperature and humidity during the transport period, and temperature and humidity variations during the transport period. Once the LMW timing threshold has been determined from the baseline, the LMW timing threshold can be implemented with the specification and applied to future transportation scheduling.

From operation 1010, Operational flow 1000 can continue to calculation operation 1012. Also, in the situation where a LMW specification exists for the product type at decision operation 1006, operational flow 1000 can also continue to operation 1012. At calculation operation 1012, load-out scheduling can be determined. The load-out scheduling can be based on the obtained receipt date and account for any transportation time in order to have receipt of the product by the receipt date. The calculation can include an automatic computer implemented calculation, a computer facilitated calculation based on scheduling data and/or the like. Also, the calculation can be manual and facilitated by an operator.

Operational flow 1000 can continue to communication operation 1014. At communication operation 1014, the load-out scheduling data can be communicated for transport scheduling as more fully set forth below. Also, the load-out scheduling data can be a communication for product adjustment scheduling as more fully set forth below. Such load-out scheduling data can include the calculated load-out date. Such load-out scheduling data can also include a receipt date. A receipt date can include a date and/or time that a product is to be tendered. As another example, load-out scheduling data can include a product type to be tendered. For example, a product type can include a LM bulk flour type. As another example, load-out scheduling data can include product quantity data. For example, product quantity data can include a volume, weight and/or other quantity of a LM bulk flour shipment. Load-out scheduling data can further include other information. For example, other information can include a load-out facility location, a receipt facility location, contacts, operators, product specifications, LM wash specifications and/or other load-out scheduling data and information. Communication operation 1014 can be facilitated by an electronic message, can be facilitated by a scheduling program such as a Gantt based program and/or can be facilitated by a telecommunication. Such communication can also be manual and facilitated by an operator. From communication operation 1014, operational flow 1000 can continue to end operation 1016.

Figure 11:
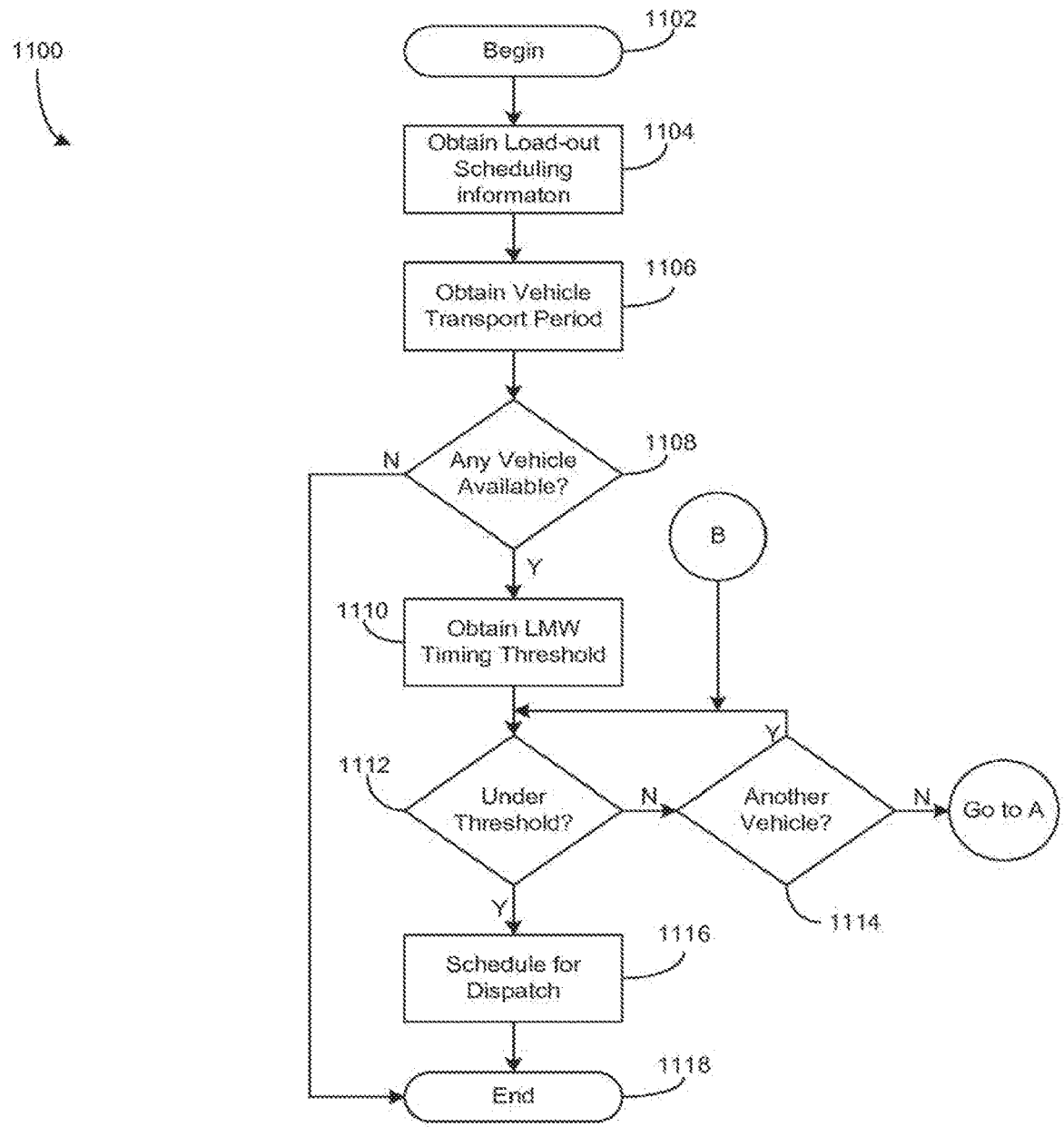
FIG. 11 is an example operational flow diagram illustrating an example process for transport scheduling.

As indicated in FIG. 8, operation 808 is described in FIGS. 11-19. FIG. 11 is an example operational flow diagram illustrating example processes associated with a process for transport scheduling of LM bulk products. Operational flow 1100 starts at begin operation 1102 and continues to obtain operation 1104 where load-out scheduling data is obtained. As indicted, load-out scheduling data can include the calculated load-out date. Such load-out scheduling data can also include a receipt date. A receipt date can include a date and/or time that a product is to be tendered. As another example, load-out scheduling data can include a product type to be tendered. For example, a product type can include a LM bulk flour type. As another example, load-out scheduling data can include product quantity data. For example, product quantity data can include a volume, weight and/or other quantity of a LM bulk flour shipment. Load-out scheduling data can further include other information. For example, other information can include a load-out facility location, a receipt facility location, contacts, operators, product specifications, LM wash specifications and/or other load-out scheduling data and information. Obtaining the load-out scheduling information can be facilitated by an electronic message, can be facilitated by a scheduling program such as a Gantt based program and/or can be facilitated by a telecommunication. Such load-out scheduling data can also be obtained manually and facilitated by an operator.

Operational flow 1100 can continue to operation 1106 where a vehicle transport period can be obtained or calculated. The vehicle transport period can include the period of time from dispatch until the receipt. The vehicle transport period can be partially based on the receipt date and/or the calculated load-out date. For example, a receipt date may be 4:00 pm on May 15. The load-out date may be 4:00 pm on May 14th in order to account for the transportation time from the load-out facility to the receipt facility. The dispatch time from the shipper may be 8:00 am on May 14th in order to account for the transportation time from the shipper to the load-out facility. Accordingly, the vehicle transport period can be calculated as being from 8:00 am on May 14th until 4:00 pm on May 15th. The calculation can include an automatic computer implemented calculation, a computer facilitated calculation based-on scheduling data and/or the like. Also, the calculation can be manual and facilitated by an operator.

From operation 1106, operational flow 1100 continues to decision operation 1108. At decision operation 1108, it is determined whether any vehicles are available for the calculated vehicle transport time. Such a determination is made by comparing the vehicle transport time to a current schedule for one or more vehicles. Continuing with the above example, a vehicle transport time can be from 8:00 am on May 14th until 4:00 pm on May 15th. This time window can be utilized to search a database of current vehicle schedules to identify whether any vehicles are available to transport a shipment during the window. The determination can include an automatic computer implemented determination, a computer facilitated determination based on scheduling data and/or the like. Also, the calculation can be manual and facilitated by an operator.

In the situation where there are no vehicles available, operational flow 1100 can continue to end operation 1118. For example, a shipping entity may need to reject the request because their scheduling is filled for the vehicle transport period. As another example, the current schedule could be changed in order to free a vehicle for the transport period.

In the situation where one or more vehicles are available for the vehicle transport period, operational flow 1100 can continue to operation 1110 where the LMW timing threshold is obtained. As indicated above, the LMW timing threshold can be obtained from a LMW specification. The LMW timing threshold can include an electronic value.

Operational flow 1100 continues to decision operation 1112. At decision operation 1112, it is determined whether any available vehicles are within the LMW timing threshold for the vehicle transport period. The determination can include an automatic computer implemented determination, a computer facilitated determination based on scheduling data and/or the like. Also, the calculation can be manual and facilitated by an operator. For example, a vehicle transport period can be from May 1st at 5:00 am (vehicle dispatch) until May 2nd at 8:00 am (receipt at customer's facility) and a LMW timing threshold can be, for example, 7 days. The LM wash record for a vehicle may indicate that the vehicle was subjected to a LMW process on April 29th at 8:00 am. The duration between April 29th at 8:00 am (LMW record) and May 2nd at 8:00 am (receipt at customer) is 4 days. The 4 days is below the LMW timing threshold (e.g. the 7 day example) for the vehicle transport period. Accordingly, the vehicle would qualify for dispatch and shipping of the LM bulk product. As another example, a vehicle transport period can be from May 1st at 5:00 am (vehicle dispatch) until May 2nd at 8:00 am (receipt at customer's facility). The LMW record for a vehicle may indicate that the vehicle was subjected to a LMW process on April 25th at 8:00 am. The duration between April 25th at 8:00 am (LMW record) and May 2nd at 8:00 am (receipt at customer) is 8 days. The 8 days is greater than the LMW timing threshold (e.g. the 7 day example) for the vehicle transport period. Accordingly, the vehicle would not qualify for dispatch unless the vehicle was subjected to the LMW process prior to dispatch.

In the situation where an available vehicle is within the LMW timing threshold for the vehicle transport period, operational flow 1100 can continue to operation 1116 where the vehicle is scheduled for dispatch. In the situation where an available vehicle is not within the LMW timing threshold, operational flow 1100 can continue to decision operation 1114. At decision operation 1114, a decision is made as to whether there is another available vehicle. In the situation where another available vehicle exists, operational flow 1100 loops back to decision operation 1112. In the situation where another available vehicle does not exist, operational flow 1100 can go to "A" where a LMW process commences. As indicated in FIG. 11, operational flow 1100 returns from the wash process at "B". Operational flow 1100 ends at end operation 1118.

FIGS. 12-19 indicate aspects of the LMW process. As used herein, the term vehicle refers to a vehicle that includes a vessel for holding bulk products. The transport vehicle can be a vehicle that includes a vessel with one or more hoppers for holding bulk products. As an example, the vessel can be a vessel as indicated in FIG. 21 for transporting bulk dry products such as flour. The vessel can include a plurality of vessel accessibility components. The vessel accessibility components can be components associated with the vessel that can harbor microbial growth that can affect the product maintained in the vessel. For example, vessel accessibility components can include removable and non-removable components that facilitate access to the vessel. For example, the facilitated access can be product access, forced air access and/or operator access. As a general example, vessel accessibility components can include valves, caps, gaskets, lids, product lines, screens and/or storage compartments for the vessel accessibility components.

A vessel accessibility component can include one or more hatch lids and one or more hatch lid gaskets. The hatch lids can be the covering that encloses the man holes that make the interior of the vessel accessible. Vessel accessibility components can also include unloading lines, unloading line caps and unloading line gaskets. Vessel accessibility components can further include pressure relief valves and pressure relief value gaskets. The pressure relief valve can be a detachable device that allows excessive pressure to release from the vessel. Vessel accessibility components can also include aerator lines and aerator line gaskets. Vessel accessibility components can further include product hoses and product hose gaskets. The product hose can be a detachable hose that is used to unload bulk product from the vessel by joining the product line to a bin port. The product line is the bottom line or plumbing that runs the length of the trailer and connects to product hoppers. Vessel accessibility components can also include in-line unloading screens. In other aspects, vessel accessibility components can include hopper swing away tees. The hopper swing away tees can be a T-shaped connector that joins the bottom of the product hopper to the product line. Vessel accessibility components can also include a screen storage box. The screen storage box can be a fabricated box with a hinge lid that is mounted to the exterior of the vehicle. The screen storage box can store the in-line unloading screen. The in-line unloading screen can be a detachable device that connects to the end of the product hose and helps to eliminate foreign materials from passing into an unloading bin. Even though the vehicle is indicated herein as a road vehicle, it is contemplated that the vessel can be transported by rail, water and/or air without departing from the disclosure herein.

As used herein, the term "sanitizing solution" can be an ammonia based sanitizer that is colorless and odorless and effective against a wide variety of microorganisms and bacteria. In one example, the sanitizer does not require rinsing after application. In another example, the sanitizer can be a benzalkonium chloride compound. An example sanitizing solution can be Quorum Clear V™ manufactured by Ecolab, Inc. As further indicated below, the sanitizing solution can be utilized manually or applied through spinners, hand held wands, and snakes. The term "wash" can be used herein to describe a hand held high pressure manual wash. The term "detail" can be used herein to describe a cleaning process that utilizes a cloth to wipe down, clean, and/or dry removable parts.

Figure 12:
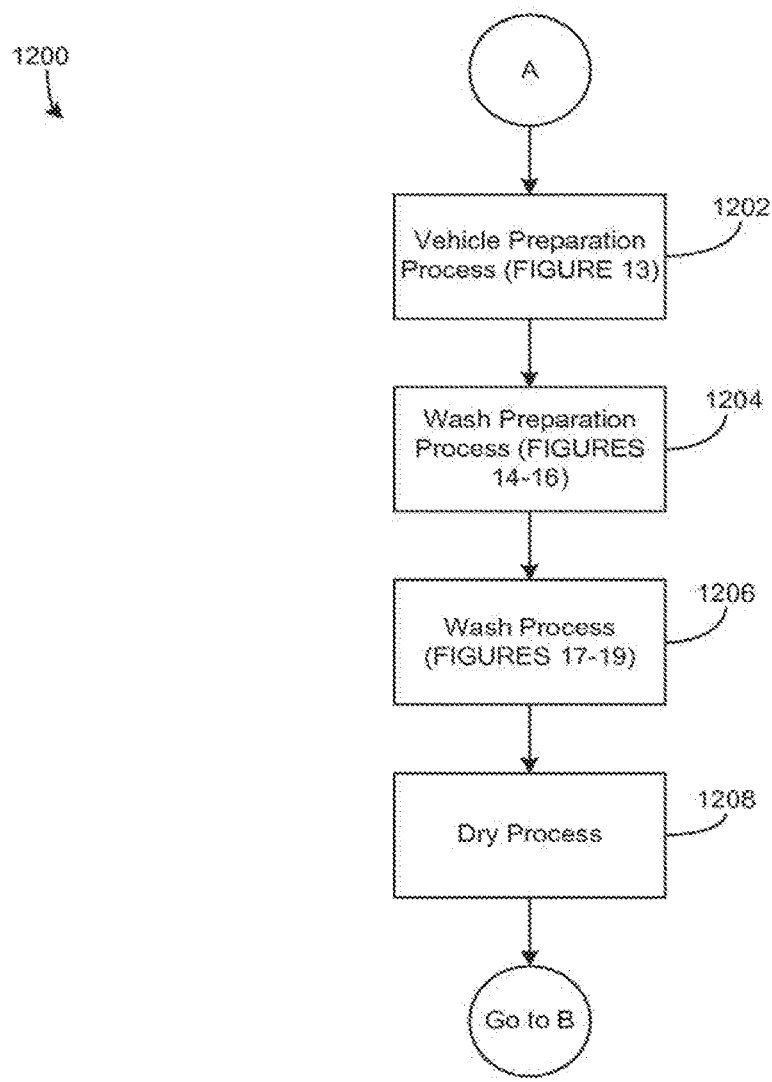
FIG. 12 is an example operational flaw diagram illustrating an example process associated with LMW processes for transport scheduling.

From process entry point "A" indicated in FIG. 11, operational flow 1200 in FIG. 12 flows to vehicle preparation process 1202. Vehicle preparation process 1202 is more fully described in association with FIG. 13. Operational flow 1200 continues to wash preparation process 1204. Wash preparation process 1204 is more fully described in FIGS. 14-16. Operational flow 1200 continues to wash process 1206. Wash process 1206 is more fully described in FIGS. 17-19. Operational flow 1200 further continues to dry process 1208. Dry process 1208 can include actuating a blower associated with the vessel to dry the vessel. The blower can include a filter to filter the air. The blower can be connected to the vessel. Depending on the type of blower, the blower can be actuated for about 30 minutes to about 60 minutes and/or until the vessel is dry. From dry process 1208, operational flow 1200 returns to "B" as indicated in FIG. 11.

Figure 13:
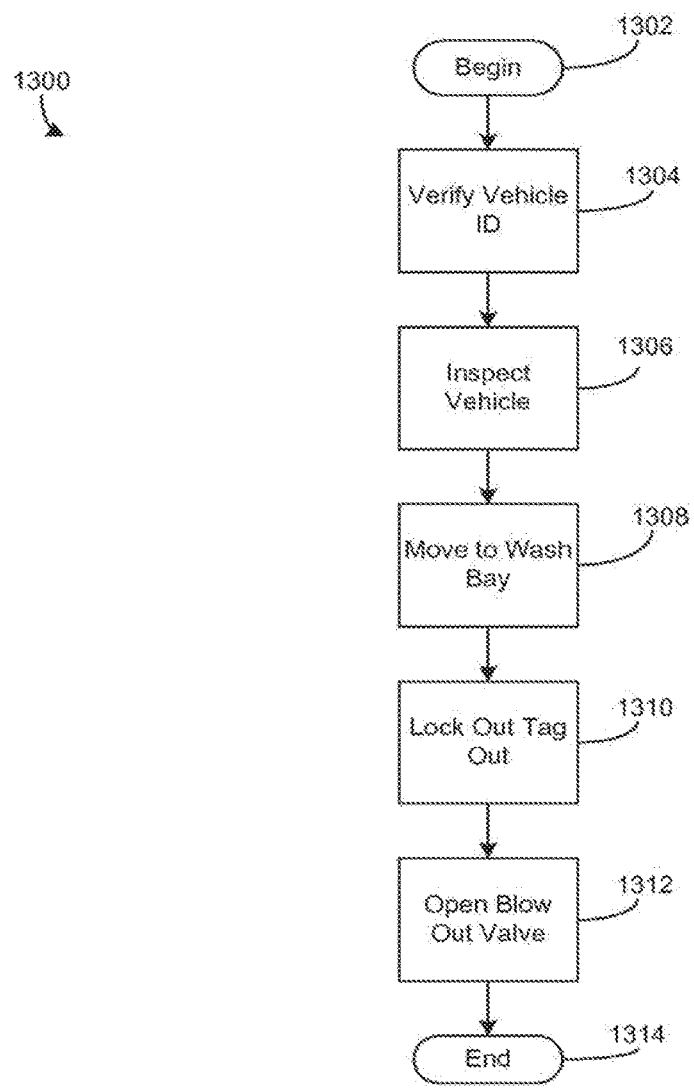
FIG. 13 is an example operational flow diagram illustrating an example process associated with LMW processes for transport scheduling.

As indicated in FIG. 12, operation 1202 is described in FIG. 13. FIG. 13 is an example operational flow diagram illustrating example vehicle preparation processes associated with a process for transport scheduling of LM bulk products. Operational flow 1300, starts at begin operation 1302 and continues to verification operation 1304. At verification operation 1304, the identification of the vehicle is verified. For example, the trailer can include a unit number that is verified. Operational flow 1300 continues to inspection operation 1306 where the vehicle is inspected. For example, the vehicle can be checked to make sure that equipment is properly stored, that the overhead door is raised and that the area is free of obstructions. The vehicle can further be inspected to verify secure fifth wheel locking. The vehicle can also be inspected to make sure that the dolly legs are raised.

Operational flow 1300 continues to operation 1308 where the vehicle is moved to a wash bay. From operation 1308, operational flow 1300 continues to operation 1310 for Lock out Tag out processes. At operation 1312, the blow out valve of the vehicle can be opened. Operational flow 1300 then continues to end operation 1314.

Figure 14:
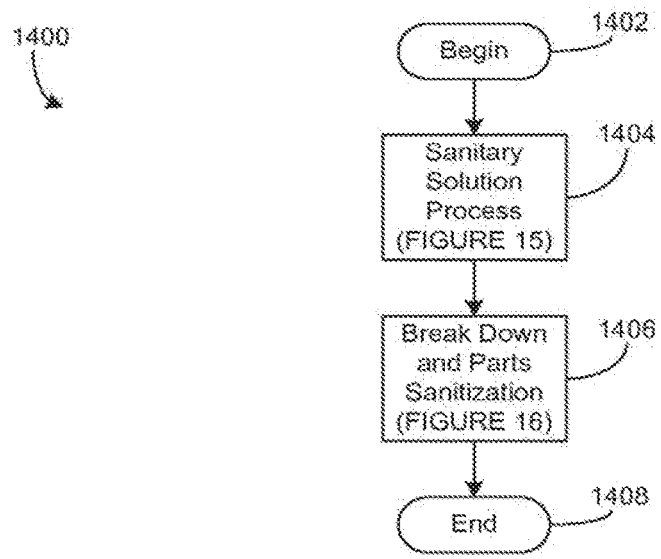
FIG. 14 is an example operational flow diagram illustrating an example process associated with LMW processes for transport scheduling.

As indicated in FIG. 12, operation 1204 is described in FIG. 14. FIG. 14 is an example operational flow diagram illustrating example wash preparation processes associated with a process for transport scheduling of LM bulk products. Operational flow 1400 starts at begin operation 1402 and continues to sanitary solution process 1404. Sanitary solution process 1404 is more fully described in FIG. 15. From sanitary solution process 1404, operational flow 1400 continues to break down and parts sanitization process 1406. Break down and parts sanitization process 1406 is more fully described in FIG. 16. Operational flow 1400 ends at end operation 1408.

Figure 15:
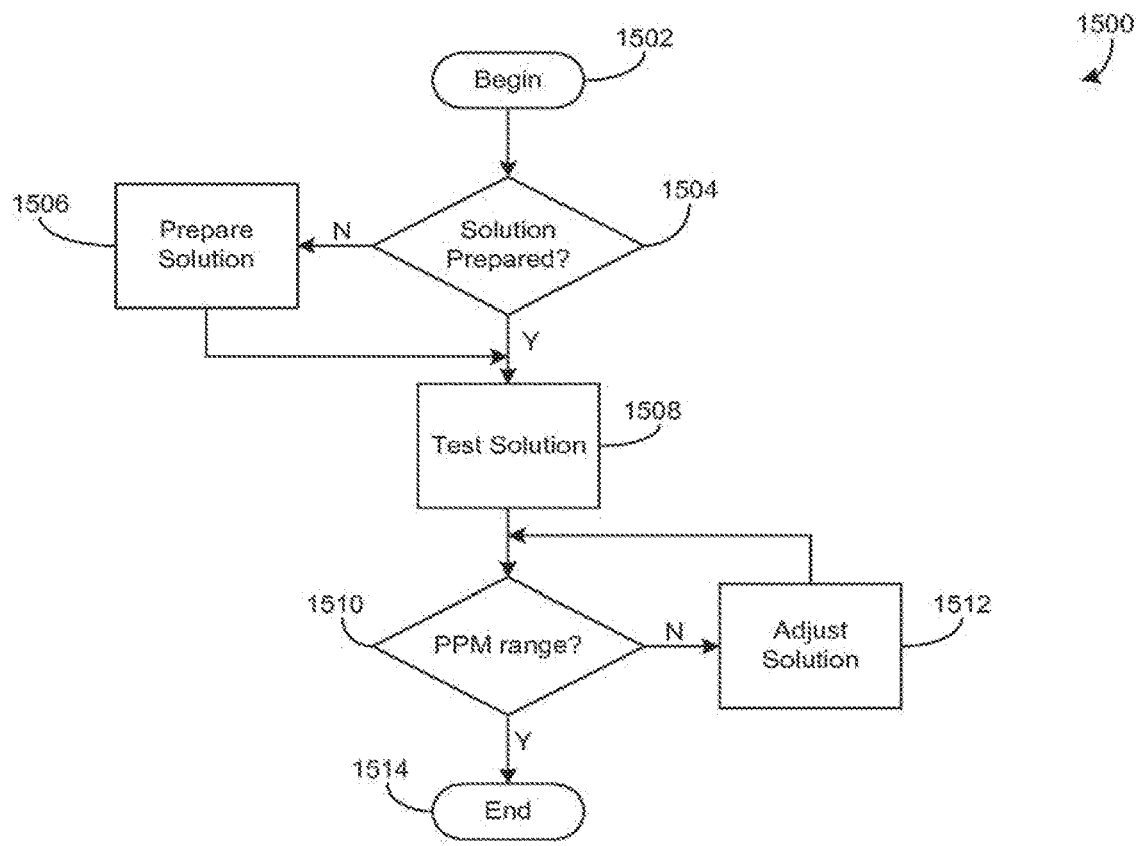
FIG. 15 is an example operational flow diagram illustrating an example process associated with LMW processes for transport scheduling.

As indicated in FIG. 12, operation 1204 is described in FIG. 15. FIG. 15 is an example operational flow diagram illustrating example sanitary solution processes associated with a process for transport scheduling of LM bulk products. Operational flow 1500 starts at begin operation 1502 and continues to decision operation 1504 where it is determined whether the sanitizing solution is prepared. The sanitizing solution can be an ammonia based sanitizer that is colorless and odorless and effective against a wide variety of microorganisms and bacteria. In one example, the sanitizer does not require rinsing after application. In another example, the sanitizer can be a benzalkonium chloride compound. An example sanitizing solution can be Quorum Clear V™ manufactured by Ecolab, Inc. In the situation where the sanitizing solution is prepared, operational flow 1500 continues to operation 1508 where the sanitizing solution is tested. In the situation where the sanitizing solution is not prepared, operational flow 1500 continues to operation 1506 where the sanitizing solution is prepared. The solution is prepared by initially diluting the sanitizing solution. Operational flow 1500 continues to operation 1508 where the solution is tested. The solution can be tested with test strips that detect the parts per million of the sanitizing solution in the dilution. Operational flow 1500 continues to decision operation 1510 where it is decided whether the diluted sanitizing solution is within a parts per million ("PPM") range. For example, the PPM can be about 150 to about 450 PPM. The PPM can be about 150 PPM, 160 PPM, 170 PPM, 180 PPM, 190 PPM, 200 PPM, 210 PPM, 220 PPM, 230 PPM, 240 PPM, 250 PPM, 260 PPM, 270 PPM, 280 PPM, 290 PPM, 300 PPM, 310 PPM, 320 PPM, 330 PPM, 340 PPM, 350 PPM, 360 PPM, 370 PPM, 380 PPM, 390 PPM, 400 PPM, 410 PPM, 420 PPM, 430 PPM, 440 PPM, 450 PPM to about 150 PPM, 160 PPM, 170 PPM, 180 PPM, 190 PPM, 200 PPM, 210 PPM, 220 PPM, 230 PPM, 240 PPM, 250 PPM, 260 PPM, 270 PPM, 280 PPM, 290 PPM, 300 PPM, 310 PPM, 320 PPM, 330 PPM, 340 PPM, 350 PPM, 360 PPM, 370 PPM, 380 PPM, 390 PPM, 400 PPM, 410 PPM, 420 PPM, 430 PPM, 440 PPM, 450 PPM. If not, operational flow 1500 continues to operation 1512 where the diluted sanitizing solution is adjusted by adding more sanitizing solution or further dilution. From operation 1512, operational flow 1500 loops back to decision operation 1510. When the diluted sanitizing solution is within the PPM range, operational flow 1500 continues to end operation 1514.

Figure 16:
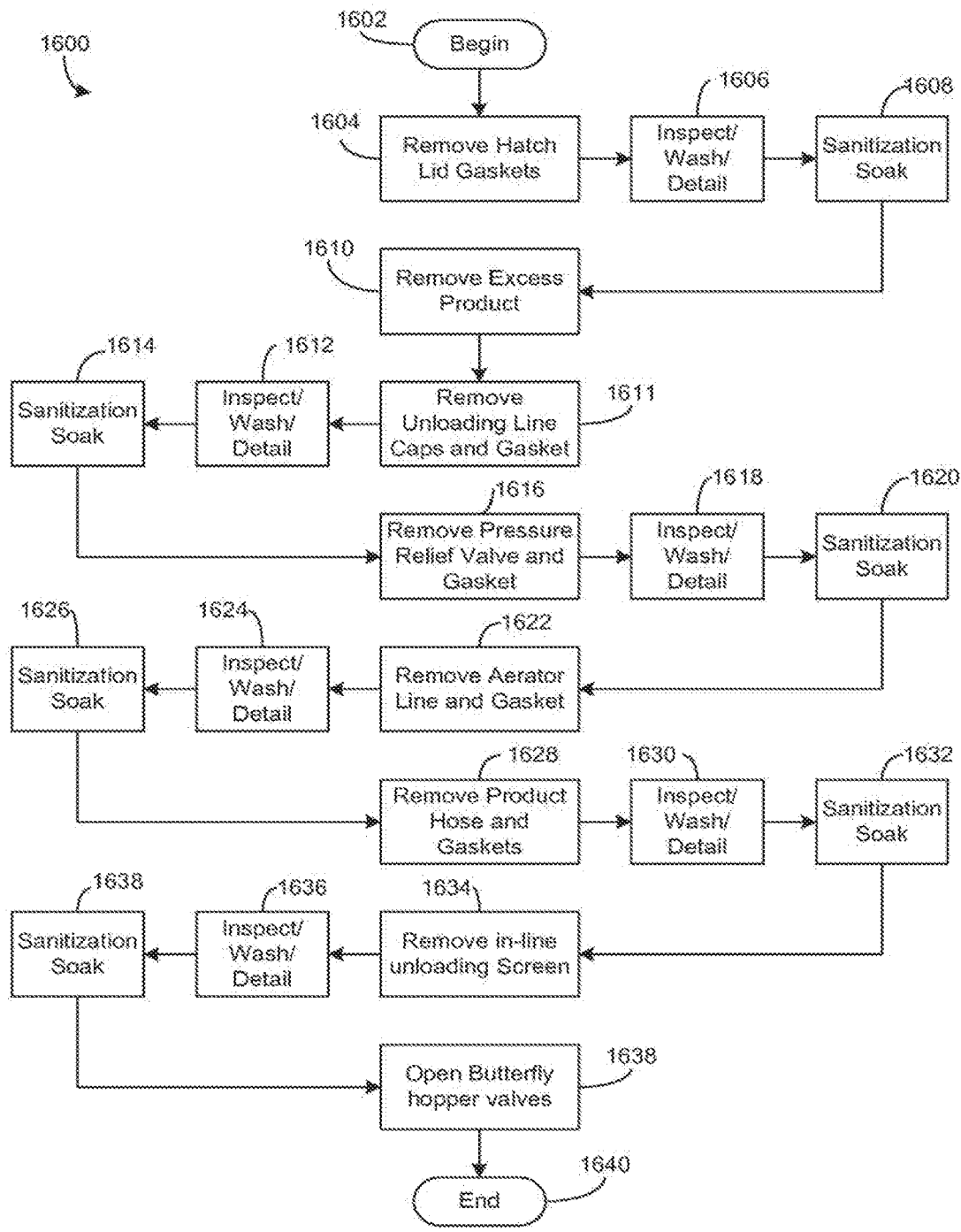
FIG. 16 is an example operational flow diagram illustrating an example process associated with LMW processes for transport scheduling.

As indicated in FIG. 12, operation 1204 is described in FIG. 16. FIG. 16 is an example operational flow diagram illustrating example break down and parts sanitization processes associated with a process for transport scheduling of LM bulk products. Operational flow 1600 can be described as a Clean Out of Place ("COP") System because parts can be separated from the vehicle and soaked in the sanitization solution and/or hot water at around 160° F. Operational flow 1600 starts at begin operation 1602 and continues to operation 1604 where the hatch lid gaskets are removed. At operation 1606, the hatch lid gaskets are inspected, washed and detailed as indicated above. Operational flow 1600 continues to operation 1608 where the hatch lid gaskets are soaked in the sanitization solution indicated above. The hatch lid gaskets can be soaked for about 1 to about 60 minutes.

From operation 1608, operational flow 1600 continues to operation 1610 where excess product is removed from the vessel. For example, heel and/or excess product can be removed and/or drained from the vessel. Operational flow 1600 continues to operation 1611 where the unloading line caps and gaskets are removed. At operation 1612, the unloading line caps and gaskets are inspected, washed and detailed as indicated above. Operational flow 1600 continues to operation 1614 where the unloading line caps and gaskets are soaked in the sanitization solution indicated above. The unloading line caps and gaskets can be soaked in the sanitizing solution for about 1 to about 60 minutes.

Operational flow 1600 continues to operation 1616 where the pressure relief valve and gasket are removed. At operation 1618, the pressure relief valve and gasket are inspected, washed and detailed as indicated above. Operational flow 1600 continues to operation 1620 where the pressure relief valve and gasket can be soaked in the sanitization solution indicated above. The pressure relief valve and gasket can be soaked for about 1 to about 60 minutes.

Operational flow 1600 continues to operation 1622 where the aerator line and gasket are removed. At operation 1624, the aerator line and gasket are inspected, washed and detailed as indicated above. Operational flow 1600 continues to operation 1626 where the aerator line and gasket are soaked in the sanitization solution indicated above. The aerator line and gasket can be soaked for about 1 to about 60 minutes.

Operational flow 1600 continues to operation 1628 where the product hose and gaskets are removed. At operation 1630, the product hose and gaskets are inspected, washed and detailed as indicated above. Operational flow 1600 continues to operation 1632 where the product hose and gaskets can be soaked and/or snaked in the sanitization solution indicated above. The product hose and gaskets can be soaked for about 1 to about 60 minutes.

Operational flow 1600 continues to operation 1634 where the in-line unloading screen is removed. At operation 1636, the in-line unloading screen is inspected, washed and detailed as indicated above. Operational flow 1600 continues to operation 1634 where the in-line unloading screen is soaked in the sanitization solution indicated above. The in-line unloading screen is can be soaked for about 1 to about 60 minutes. At operation 1638, the butterfly hopper valves are opened and operational flow 1600 ends at end operation 1640.

Figure 17:
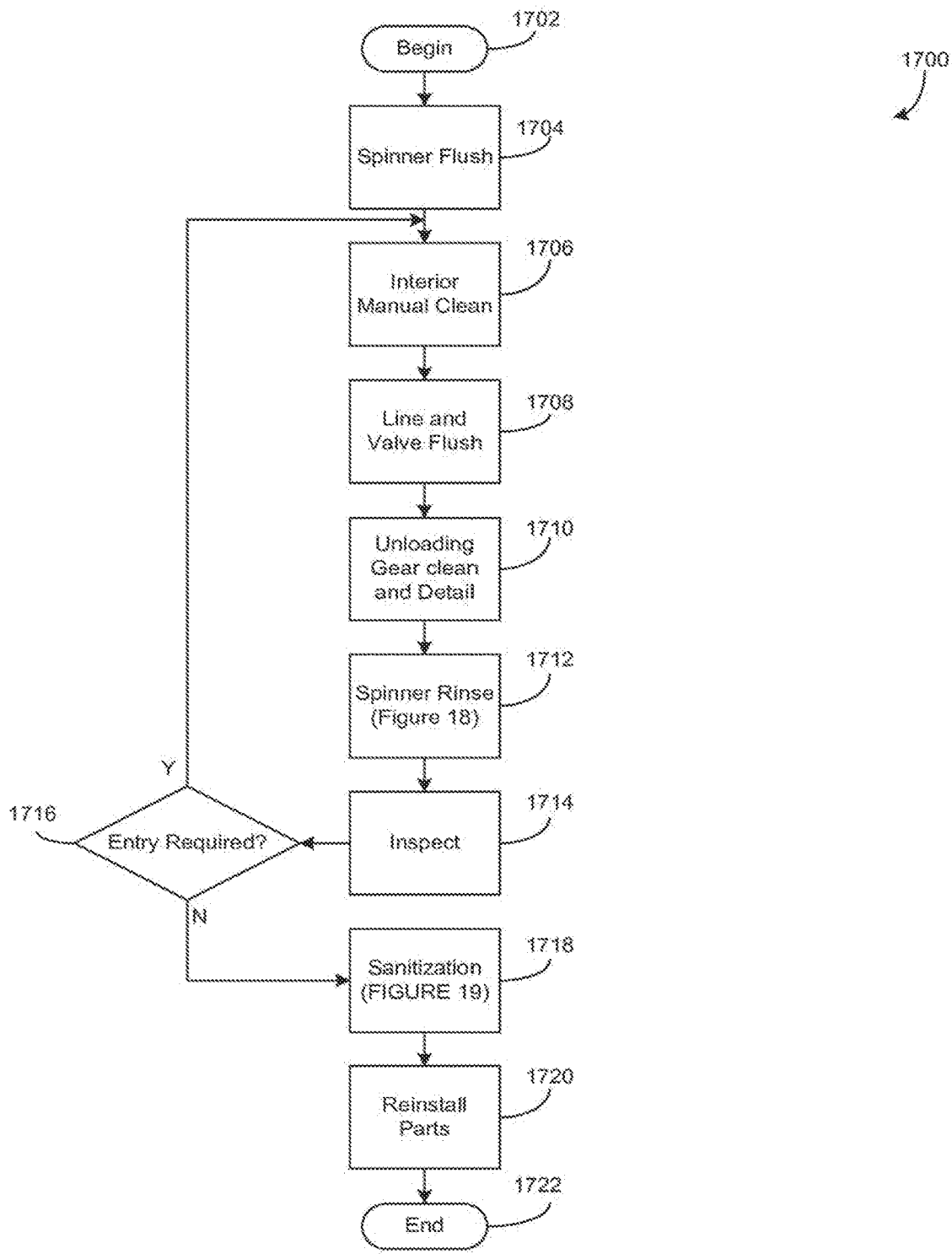
FIG. 17 is an example operational flow diagram illustrating an example process associated with LMW processes for transport scheduling.

As indicated in FIG. 12, operation 1206 is further described in FIG. 17. FIG. 17 is an example operational flow diagram illustrating example vessel wash processes associated with a process for transport scheduling of LM bulk products. Operational flow 1700 starts at begin operation 1702 and continues to spinner flush operation 1704. The spinner flush facilitates the break up of product and/or residue inside the vessel and aids manual cleaning. Spinners are placed and secured in each hopper man hole. Water is applied to the spinners for approximately 15 minutes for an initial flush. The spinners are then removed and the bottom product line is snaked.

Operational flow 1700 continues to interior manual clean operation 1706. Interior and manual clean operation 1706 can include manually removing build up, product and/or residue from the interior of the vessel via a hand held pressure wand. During interior manual clean operation 1706, problematic areas may require additional manual cleaning and the vessel can be inspected to ensure that all visible residue has been removed.

Operational flow 1700 continues to line and valve flush operation 1708. A hand held wand and adapter can be utilized to wash any aerator lines, top air lines, the port for the pressure relief valve, and product hoses. Operational flow 1700 continues to unloading gear clean and detail operation 1710. Unloading clean and detail operation 1710 can include opening the hopper swing away tees. Each hopper swing away tee can be inspected, washed and detailed as indicated above. Operation 1710 can further include reinstalling the swing away tees and the gasket and the product line can then be snaked.

Operational flow 1700 continues to spinner rinse operation 1712. Spinner rinse operation 1712 is more fully set forth in FIG. 18. From spinner rinse operation 1712, operational flow 1700 continues to inspection operation 1714. Inspection operation 1714 can include inspecting any loading lines, vents, port coverings, unloading lines, aerator lines for clean and sanitary conditions. Operational flow 1700 continues to decision operation 1716 where it is determined whether entry was required during inspection operation 1714. Operational flow 1700 loops back to operation 1706 when entry into the vessel was required. When entry into the vessel is not required, operational flow 1700 continues to sanitization operation 1718. Sanitization operation 1718 is more fully set forth in FIG. 19.

From sanitization operation 1718, operational flow 1700 continues to reinstall parts operation 1720. Reinstall parts operation 1720 can include removing any gaskets, caps, valves and unloading components from the sanitization soak indicated in FIG. 16. The components removed from the sanitization soak can be allowed to air dry on a racking system. After drying, any gaskets can be reinstalled. The sanitized pressure relief valve can be affixed to the vessel port, secured and sealed. The sanitized cap to the aerator line can be affixed, secured and sealed. The sanitization cap to the front of the product line can be affixed, secured and sealed. Also, sanitized caps can be affixed to the in-line unloading screen. The sanitized unloading screen can be placed into a sterile storage bag. The sterile storage bag with the in-line unloading screen can then be placed into the storage box, secured and sealed. The sanitized product hose is closed with respective sanitized caps and the sanitized product hose is placed in the hose tube. Also, the sanitized product line is closed with a sanitized cap. From operation 1720, operational flow 1700 ends at end operation 1722.

Figure 18:
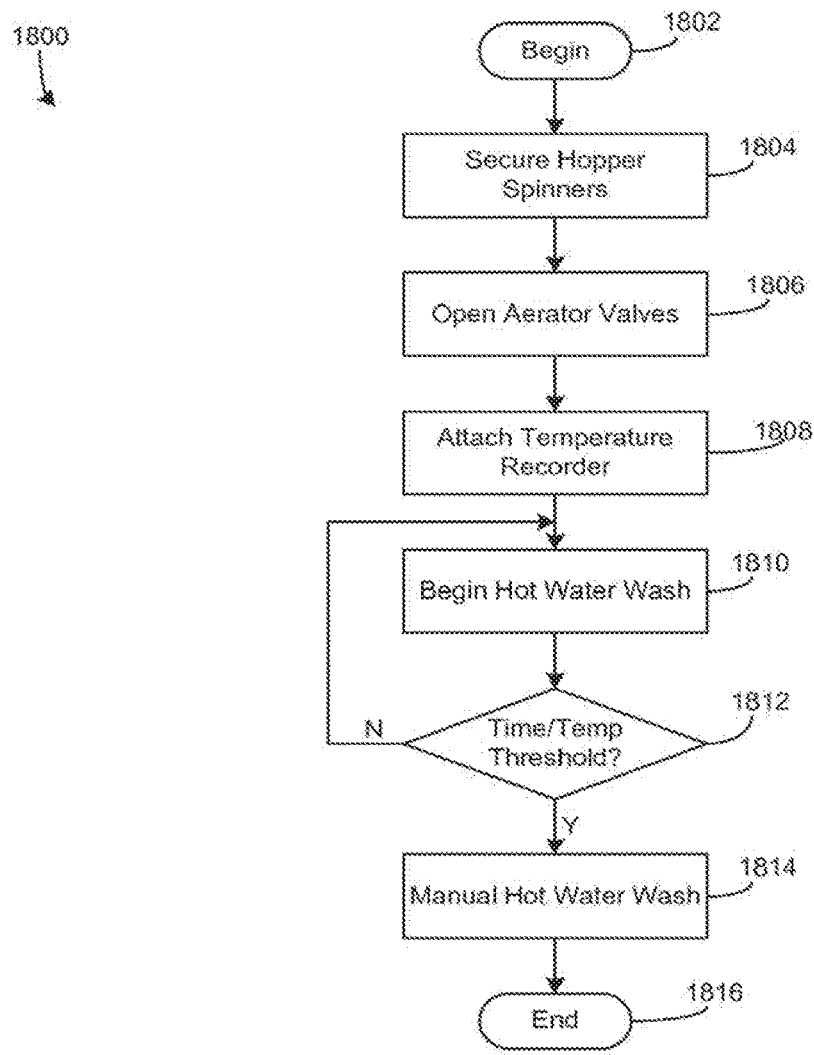
FIG. 18 is an example operational flow diagram illustrating an example process associated with LMW processes for transport scheduling.

As indicated in FIG. 12, operation 1206 is further described in FIG. 18. FIG. 18 is an example operational flow diagram illustrating example spinner rinse processes associated with a process for transport scheduling of LM bulk products. Operational flow 1800 starts at begin operation 1802 and continues to operation 1804 where the hopper spinners are secured in each hopper. At operation 1806, any aerator valves are opened. Operational flow 1800 continues to operation 1808 where a temperature recording device is attached to the rear end of the bottom product line. A hot water wash begins at operation 1810 where hot water is forced through the spinners. Operational flow 1800 continues to decision operation 1812. At decision operation 1812, a determination is made as to whether a time and temperature threshold has been attained for the hot water wash. In one aspect, the temperature threshold can be at least 160° F. In another aspect, the temperature-threshold can be about 140° F., 145° F., 150° F., 155° F., 160° F., 165° F., 170° F., 175° F., 180° F., 185° F., 190° F., 195° F., 200° F., 205° F., 210° F., 215° F. to about 140° F., 145° F., 150° F., 155° F., 160° F., 165° F., 170° F., 175° F., 180° F., 185° F., 190° F., 195° F., 200° F., 205° F., 210° F., 215° F. In another aspect, the time threshold can be 15 consecutive minutes. In another aspect, the time threshold can be about 10 consecutive minutes, 11 consecutive minutes, 12 consecutive minutes, 13 consecutive minutes, 14 consecutive minutes, 15 consecutive minutes, 16 consecutive minutes, 17 consecutive minutes, 18 consecutive minutes, 19 consecutive minutes, 20 consecutive minutes to about 10 consecutive minutes, 11 consecutive minutes, 12 consecutive minutes, 13 consecutive minutes, 14 consecutive minutes, 15 consecutive minutes, 16 consecutive minutes, 17 consecutive minutes, 18 consecutive minutes, 19 consecutive minutes, 20 consecutive minutes. In the situation where the temperature threshold of the hot water is not maintained at the time threshold for the wash, operational flow 1800 loops back to operation 1810 where the hot water wash process starts over. In the situation where the hot water wash achieves that time and temperature threshold, operational flow 1800 continues to manual hot water wash operation 1814. At operation 1814, a hand held wand and/or snake can be utilized to apply hot water to the aerator line, the pressure relief vessel port, the product hose and any product lines.

Figure 19:
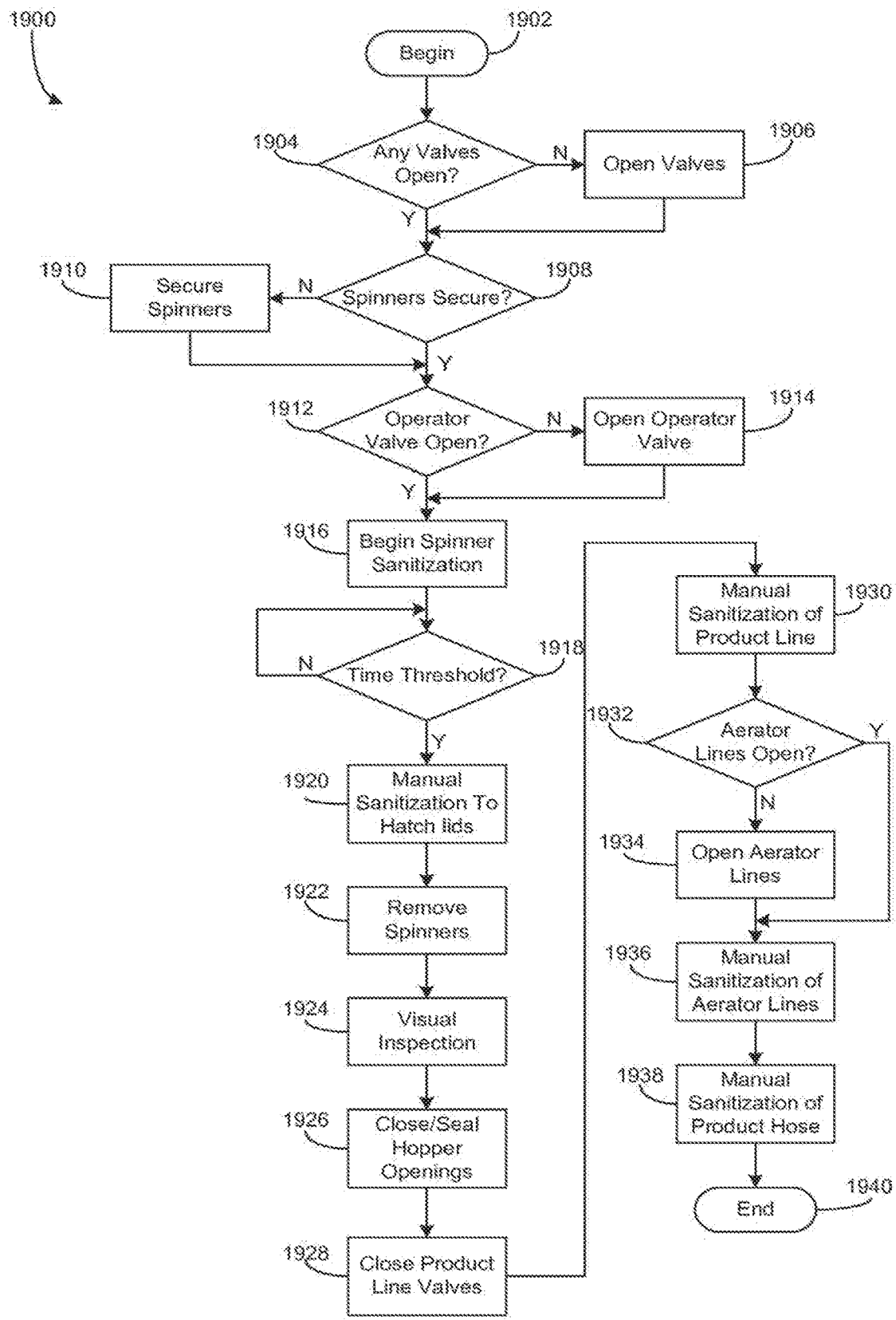
FIG. 19 is an example operational flow diagram illustrating an example process associated with LMW processes for transport scheduling.

As indicated in FIG. 12, operation 1206 is further described in FIG. 19. FIG. 19 is an example operational flow diagram illustrating example spinner sanitization processes associated with a process for transport scheduling of LM bulk products. Operational flow 1900 starts at begin operation 1902 and continues to decision operation 1904. At decision operation 1904, it is determined whether any aerator, product and/or hopper valves are open. If not, operational flow 1900 continues to operation 1906 where the valves are opened. Operational flow 1900 continues to decision operation 1908 where it is determined whether the spinners are secured to each hopper opening. If not, operational flow 1900 continues to operation 1910 where the spinners are secured. Operational flow 1900 then continues to decision operation 1912 where it is determined whether the operator valve is open. If not, operational flow 1900 continues to operation 1914 where the operator valve is opened.

Operational flow 1900 continues to operation 1916 where spinner sanitization begins. In one aspect, an automated sanitizer injection mechanism can be switched to on open position to flow the sanitization solution indicated above to the spinners. Operational flow 1900 continues to decision operation 1918 where it is determined whether a time threshold has been achieved for the application of the sanitization solution via the spinners. For example, the time threshold can be 10 minutes. If the time threshold has not been achieved, operational flow 1900 loops back as indicated in FIG. 19. If the time threshold has been achieved, operational flow 1900 continues to operation 1920.

At operation 1920 the hatch lids can be manually sanitized by applying the sanitization solution to the hatch lids via the hand held wand. Operational flow 1900 continues to operation 1922 where the spinners are removed from the hopper openings. At operation 1924 the inside of the vessel is inspected with a shatter resistant flash light to ensure that there is not foreign material in the vessel, that there is not missed solution coverage and that any internal working parts of aerators are installed.

Operational flow 1900 continues to operation 1926 where the hopper openings are closed and sealed. At operation 1928, the product line valves are closed and at operation 1930 manual sanitization of the product lines begin. The product lines can be sanitized by applying sanitizing solution to the product line via a hand held snaking device. Operational flow 1930 continues to decision operation 1932 where it is determined whether the aerator lines are open. If the aerator lines are not open, operational flow 1900 continues to operation 1934 where the aerator lines are opened. If the aerator lines are open, operational flow 1900 continues to operation 1936 where the aerator lines are manually sanitized. The aerator lines can be sanitized by applying sanitizing solution of the product line via a hand held snaking device. Operational flow 1900 continues to operation 1938 where the product hose is manually sanitized. The product hose can be manually sanitized by applying the sanitization solution to the product hose via a hand held device. Operational flow 1900 then continues to end operation 1940.

Figure 20:
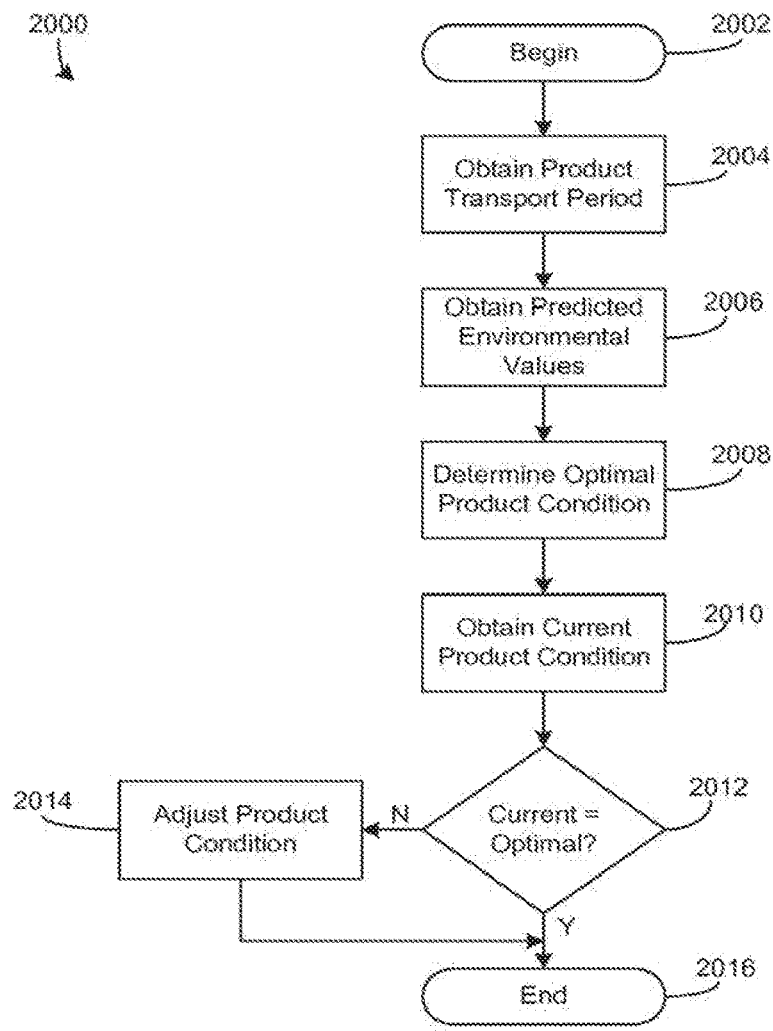
FIG. 20 is an example operational flow diagram illustrating example product adjustment scheduling processes for transport scheduling.

Referring back to FIG. 8, operations 812 and 814 are more fully described in FIG. 20. FIG. 20 is an example operational flow diagram illustrating example product adjustment scheduling processes for transport scheduling. As indicated in FIG. 20, operational flow 2000 starts at begin operation 2002 and continues to operation 2004 where a product transport period is obtained. In one aspect, the product transport period can be at least partially based on the load-out date and the receipt date. The product transport period can include the duration between load-out and when the product is received at a receiving facility. Operational flow 2000 continues to operation 2006 where predicted environmental values are obtained. For example, a weather value for the product transport period can be obtained, a temperature value for the product transport period can be obtained, a humidity value for the transport period can be obtained and/or any other environmental value associated with the product transport period can be obtained.

Operational flow 2000 continues to operation 2008 where an optimal product condition is determined. The optimal product condition can be the optimal moisture content and temperature of the product to account for the predicted environmental values during the transport period. For example, a predicted environmental temperature can be 100° F. for a product transport period. The optimal product condition can be a condition within a range of 100° F. to minimize any possibility of condensation forming.

Operational flow 2000 continues to operation 2010 where the current product condition of the LM bulk product is obtained. The current product condition can be obtained via one or more sensors as indicated above. Operational flow 2000 continues to decision operation 2010 where it is determined whether the current product condition is the optimal product condition for the predicted environmental conditions for the transport period. As another example, the current product conditions can be within a range and/or a threshold of the optimal product conditions. In the situation where the current product conditions are not the optimal product conditions, operational flow 2000 can continue to operation 2014 where the conditions of the product are adjusted. The adjustment of the product can occur via heating devices, cooling devices, drying device and/or moisture devices as more fully set forth above. As an example, the current product condition may be 75° F., the predicted environmental condition may be 100° F. and the optimal product condition may be determined to be in the range of 80° F. to 100° F. Accordingly, a heating device may heat the product to raise the temperature of the product from 75° F. to at least 80° F. From operation 2014, operational flow 2000 continues to end operation 2016. Also, in the situation where the current product condition is the optimal product condition, operational flow 2000 can continue to end operation 2016.

C. Examples

Referring back to FIG. 12, the LMW processes indicated by operations 1202-1208 have been described. As more fully set forth in the TABLES below, transport vehicles were tested in association with the described LMW process. The transport vehicles were tested by swabbing 10 different locations on the transport vehicle and testing each of the swabs for microbial activity. The swabs were tested in accordance with AOAC and FDA testing methodology. FIG. 10 indicates the location of the 10 different swab points. Swab point 1 is located at the nose manhole. Swab point 2 is located at the tail manhole. Swab point 3 is located at the inside center sidewall. Swab point 4 is located at the inside weld points between hoppers. Swab point 5 is located at the top of the airline. Swab point 6 is located at the inside tail bulkhead. Swab point 7 is located at the inside aerator cones. Swab point 8 is located at the unload product line. Swab point 9 is located at the aerator housing. Swab point 10 is located at the blown down valve. Swab point 11 is located at the product hose/hose tube.

In the tables below, several of the swab points have CFU counts indicated as 9. The value of 9 was inserted into the tables below, when the CFU of the swab point was less than 10. The value of 9 was chosen as the most conservative value for calculating the reductions as indicated below.

1. Test Vehicle 1

TABLE 1

Microbial Populations in UNWASHED Trailers (CFU/SWAB)

| Swab Point | Aerobic Plate Count | Enterobacteriaceae | Yeast | Mold |
|---|---|---|---|---|
| 1 | 220000 | 100000 | 410 | 50 |
| 2 | 270000 | 260000 | 1600 | 200 |
| 3 | 79000 | 14000 | 470 | 190 |
| 4 | 26000 | 12000 | 120 | 20 |
| 5 | 13000 | 20000 | 3000 | 20 |
| 6 | 550000 | 180000 | 1300 | 130 |
| 7 | 8500 | 9 | 3700 | 30 |
| 8 | 260000 | 190 | 290 | 230 |
| 9 | 80 | 30 | 80 | 9 |
| 10 | 780000 | 180000 | 70000 | 88000 |

Table 1 above indicates the aerobic plate count, the enterobacteriaceae count, the yeast count and the mold count for an unwashed transport vehicle.

TABLE 2

Microbial Populations in HOT WATER WASH Trailers (CFU/SWAB)

| Swab Point | Aerobic Plate Count | Enterobacteriaceae | Yeast | Mold |
|---|---|---|---|---|
| 1 | 9 | 9 | 9 | 9 |
| 2 | 750000 | 590000 | 35000 | 530 |
| 3 | 20 | 9 | 20 | 10 |

TABLE 2-continued

Microbial Populations in HOT WATER WASH Trailers (CFU/SWAB)

| Swab Point | Aerobic Plate Count | Enterobacteriaceae | Yeast | Mold |
|---|---|---|---|---|
| 4 | 90 | 9 | 20 | 10 |
| 5 | 9 | 9 | 9 | 9 |
| 6 | 9 | 9 | 9 | 9 |
| 7 | 180 | 9 | 50 | 20 |
| 8 | 110 | 9 | 10 | 30 |
| 9 | 250 | 70 | 40 | 50 |
| 10 | 36000 | 28000 | 4800 | 67000 |

Table 2 above indicates the aerobic plate count, the enterobacteriaceae count, the yeast count and the mold count for a vehicle that was washed with hot water only.

TABLE 3

Microbial Populations in LOW MICROBIAL WASH PROCESS Trailers (CFU/SWAB)

| Swab Point | Aerobic Plate Count | Enterobacteriaceae | Yeast | Mold |
|---|---|---|---|---|
| 1 | 9 | 9 | 9 | 9 |
| 2 | 10 | 9 | 20 | 10 |
| 3 | 9 | 9 | 20 | 10 |
| 4 | 9 | 9 | 9 | 9 |
| 5 | 9 | 9 | 9 | 9 |
| 6 | 9 | 9 | 9 | 9 |
| 7 | 90 | 9 | 9 | 9 |
| 8 | 9 | 9 | 10 | 10 |
| 9 | 260 | 9 | 20 | 9 |
| 10 | 9 | 9 | 10 | 100 |

Table 3 above indicates the aerobic plate count, the enterobacteriaceae count, the yeast count and the mold count for a transport vehicle washed according to the LMW process indicated above.

TABLE 4

COMPARISON - UNWASHED TO LMW PROCESS - % DECREASE

| Swab Point | Aerobic Plate Count | Enterobacteriaceae | Yeast | Mold |
|---|---|---|---|---|
| 1 | 99.996% | 99.991% | 97.805% | 82.000% |
| 2 | 99.996% | 99.997% | 98.750% | 95.000% |
| 3 | 99.989% | 99.936% | 95.745% | 94.737% |
| 4 | 99.965% | 99.925% | 92.500% | 55.000% |
| 5 | 99.931% | 99.955% | 99.700% | 55.000% |
| 6 | 99.998% | 99.995% | 99.308% | 93.077% |
| 7 | 98.941% | 0.000% | 99.757% | 70.000% |
| 8 | 99.997% | 95.263% | 96.552% | 95.652% |
| 9 | 0.000% | 70.000% | 75.000% | 0.000% |
| 10 | 99.999% | 99.995% | 99.986% | 99.886% |

Table 4 is a comparison between the unwashed transport vehicle test results to the transport vehicle that was washed according to the LMW process indicated above. The numbers indicate the percentage decrease in activity between the unwashed swab point and the swab point from the vehicle undergoing the LMW process.

TABLE 5

COMPARISON - HOT WATER TO LMW PROCESS - % DECREASE

| Swab Point | Aerobic Plate Count | Enterobacteriaceae | Yeast | Mold |
|---|---|---|---|---|
| 1 | 0.000% | 0.000% | 0.000% | 0.000% |
| 2 | 99.999% | 99.998% | 99.943% | 98.113% |
| 3 | 55.000% | 0.000% | 0.000% | 0.000% |
| 4 | 90.000% | 0.000% | 55.000% | 10.000% |
| 5 | 0.000% | 0.000% | 0.000% | 0.000% |
| 6 | 0.000% | 0.000% | 0.000% | 0.000% |
| 7 | 50.000% | 0.000% | 82.000% | 55.000% |
| 8 | 91.818% | 0.000% | 0.000% | 66.667% |
| 9 | 0.000% | 87.143% | 50.000% | 82.000% |
| 10 | 99.975% | 99.968% | 99.792% | 99.851% |

Table 5 is a comparison between the transport vehicle wash in hot water only and the transport vehicle that was washed according to the LMW process indicated above. The numbers indicate the percentage decrease in activity between the hot water swab points and the swab points from the vehicle undergoing the LMW process.

2. Test Vehicle 2

TABLE 6

Microbial Populations in UNWASHED Trailers (CFU/SWAB)

| Swab Point | Aerobic Plate Count | Enterobacteriaceae | Yeast | Mold |
|---|---|---|---|---|
| 1 | 11000000 | 1000000 | 120 | 9 |
| 2 | 2500000 | 3000000 | 16000 | 1200 |
| 3 | 2500000 | 1000000 | 440 | 30 |
| 4 | 12000000 | 1000000 | 4900 | 30 |
| 5 | 8600000 | 1000000 | 9000 | 820 |
| 6 | 1200000 | 580000 | 720 | 30 |
| 7 | 2500000 | 38000 | 130000 | 1200 |
| 8 | 610 | 560 | 9 | 10 |
| 9 | 250 | 4800 | 30 | 70 |
| 10 | 410000 | 62000 | 10 | 100 |
| 11 | 2500000 | 130000 | 150000 | 80 |

Table 6 above indicates the aerobic plate count, the enterobacteriaceae count, the yeast count and the mold count for an unwashed transport vehicle.

TABLE 7

Microbial Populations in HOT WATER WASH Trailers (CFU/SWAB)

| Swab Point | Aerobic Plate Count | Enterobacteriaceae | Yeast | Mold |
|---|---|---|---|---|
| 1 | 20 | 9 | 9 | 9 |
| 2 | 880 | 30 | 9 | 9 |
| 3 | 900 | 60 | 9 | 9 |
| 4 | 700 | 9 | 9 | 9 |
| 5 | 140 | 9 | 9 | 9 |
| 6 | 2800 | 9 | 9 | 10 |
| 7 | 420000 | 15000 | 520 | 220 |
| 8 | 380000 | 3600 | 450 | 10 |
| 9 | 2500 | 10 | 9 | 9 |
| 10 | 31000 | 2800 | 2700 | 10 |
| 11 | 250000 | 5600 | 2200 | 490 |

Table 7 above indicates the aerobic plate count, the enterobacteriaceae count, the yeast count and the mold count for a vehicle that was washed with hot water only.

TABLE 8

Microbial Populations in LOW MICROBIAL WASH PROCESS Trailers (CFU/SWAB)

| Swab Point | Aerobic Plate Count | Enterobacteriaceae | Yeast | Mold |
| --- | --- | --- | --- | --- |
| 1 | 9 | 9 | 9 | 9 |
| 2 | 80 | 10 | 520 | 9 |
| 3 | 20 | 9 | 9 | 10 |
| 4 | 10 | 9 | 9 | 9 |
| 5 | 9 | 9 | 9 | 9 |
| 6 | 9 | 9 | 9 | 9 |
| 7 | 10 | 9 | 9 | 9 |
| 8 | 10 | 9 | 9 | 9 |
| 9 | 9 | 9 | 9 | 9 |
| 10 | 90 | 9 | 9 | 9 |
| 11 | 50 | 9 | 10 | 9 |

Table 8 above indicates the aerobic plate count, the enterobacteriaceae count, the yeast count and the mold count for a transport vehicle washed according to the LMW process indicated above.

TABLE 9

COMPARISON - UNWASHED TO LMW PROCESS - % DECREASE

| Swab Point | Aerobic Plate Count | Enterobacteriaceae | Yeast | Mold |
| --- | --- | --- | --- | --- |
| 1 | 100.000% | 99.999% | 92.500% | 0.000% |
| 2 | 99.997% | 100.000% | 96.750% | 99.250% |
| 3 | 99.999% | 99.999% | 97.955% | 66.667% |
| 4 | 100.000% | 99.999% | 99.816% | 70.000% |
| 5 | 100.000% | 99.999% | 99.900% | 98.902% |
| 6 | 99.999% | 99.998% | 98.750% | 70.000% |
| 7 | 100.000% | 99.976% | 99.993% | 99.250% |
| 8 | 98.361% | 98.393% | 0.000% | 10.000% |
| 9 | 96.400% | 99.813% | 70.000% | 87.143% |
| 10 | 99.978% | 99.985% | 10.000% | 91.000% |
| 11 | 99.998% | 99.993% | 99.993% | 88.750% |

Table 9 is a comparison between the unwashed transport vehicle test results to the transport vehicle that was washed according to the LMW process indicated above. The numbers indicate the percentage decrease in activity between the unwashed swab point and the swab point from the vehicle undergoing the LMW process.

TABLE 10

COMPARISON - HOT WATER TO LMW PROCESS - % DECREASE

| Swab Point | Aerobic Plate Count | Enterobacteriaceae | Yeast | Mold |
| --- | --- | --- | --- | --- |
| 1 | 55.000% | 0.000% | 0.000% | 0.000% |
| 2 | 90.909% | 66.667% | 0.000% | 0.000% |
| 3 | 97.778% | 85.000% | 0.000% | 0.000% |
| 4 | 98.571% | 0.000% | 0.000% | 0.000% |
| 5 | 93.571% | 0.000% | 0.000% | 0.000% |
| 6 | 99.679% | 0.000% | 0.000% | 10.000% |
| 7 | 99.998% | 99.940% | 98.269% | 95.909% |
| 8 | 99.997% | 99.750% | 98.000% | 10.000% |
| 9 | 99.640% | 10.000% | 0.000% | 0.000% |
| 10 | 99.710% | 99.679% | 99.667% | 10.000% |
| 11 | 99.980% | 99.839% | 99.545% | 98.163% |

Table 10 is a comparison between the transport vehicle wash in hot water only and the transport vehicle that was washed according to the LMW process indicated above. The numbers indicate the percentage decrease in activity between the hot water swab points and the swab points from the vehicle undergoing the LMW process.

3. Test Vehicle 3

TABLE 11

Microbial Populations in UNWASHED Trailers (CFU/SWAB)

| Swab Point | Aerobic Plate Count | Enterobacteriaceae | Yeast | Mold |
| --- | --- | --- | --- | --- |
| 1 | 250000 | 180000 | 490 | 40 |
| 2 | 490000 | 290000 | 1700 | 60 |
| 3 | 330000 | 200000 | 710 | 190 |
| 4 | 480000 | 390000 | 1000 | 130 |
| 5 | 440000 | 380000 | 1600 | 20 |
| 6 | 290000 | 260000 | 70 | 80 |
| 7 | 2500000 | 1000000 | 9 | 85000 |
| 8 | 950000 | 660000 | 400 | 210 |
| 9 | 140 | 9 | 50 | 9 |
| 10 | 2500000 | 1000000 | 3000000 | 1600 |
| 11 | 2500000 | 40 | 6000000 | 30 |

Table 11 above indicates the aerobic plate count, the enterobacteriaceae count, the yeast count and the mold count for an unwashed transport vehicle.

TABLE 12

Microbial Populations In HOT WATER WASH Trailers (CFU/SWAB)

| Swab Point | Aerobic Plate Count | Enterobacteriaceae | Yeast | Mold |
| --- | --- | --- | --- | --- |
| 1 | 240 | 9 | 2400 | 200 |
| 2 | 9 | 9 | 9 | 9 |
| 3 | 150 | 9 | 9 | 9 |
| 4 | 10 | 9 | 9 | 9 |
| 5 | 9 | 9 | 100 | 9 |
| 6 | 9 | 9 | 10 | 9 |
| 7 | 330 | 9 | 9 | 9 |
| 8 | 240 | 9 | 40 | 9 |
| 9 | 100 | 9 | 9 | 9 |
| 10 | 460 | 9 | 9 | 10 |
| 11 | 20 | 9 | 10 | 9 |

Table 12 above indicates the aerobic plate count, the enterobacteriaceae count, the yeast count and the mold count for a vehicle that was washed with hot water only.

TABLE 13

Microbial Populations in LOW MICROBIAL WASH PROCESS Trailers (CFU/SWAB)

| Swab Point | Aerobic Plate Count | Enterobacteriaceae | Yeast | Mold |
| --- | --- | --- | --- | --- |
| 1 | 9 | 9 | 9 | 9 |
| 2 | 9 | 9 | 9 | 9 |
| 3 | 9 | 9 | 10 | 9 |
| 4 | 9 | 9 | 9 | 9 |
| 5 | 10 | 9 | 9 | 9 |
| 6 | 9 | 9 | 9 | 9 |
| 7 | 190 | 9 | 70 | 10 |
| 8 | 20 | 9 | 9 | 9 |
| 9 | 80 | 9 | 80 | 9 |
| 10 | 9 | 9 | 9 | 9 |
| 11 | 9 | 9 | 9 | 9 |

Table 13 above indicates the aerobic plate count, the enterobacteriaceae count, the yeast count and the mold count fora transport vehicle washed according to the LMW process indicated above.

TABLE 14

COMPARISON - UNWASHED TO LMW PROCESS - % DECREASE

| Swab Point | Aerobic Plate Count | Enterobacteriaceae | Yeast | Mold |
|---|---|---|---|---|
| 1 | 99.996% | 99.995% | 98.163% | 77.500% |
| 2 | 99.998% | 99.997% | 99.471% | 85.000% |
| 3 | 99.997% | 99.996% | 98.592% | 95.263% |
| 4 | 99.998% | 99.998% | 99.100% | 93.077% |
| 5 | 99.998% | 99.998% | 99.438% | 55.000% |
| 6 | 99.997% | 99.997% | 87.143% | 88.750% |
| 7 | 99.992% | 99.999% | 0.000% | 99.988% |
| 8 | 99.998% | 99.999% | 97.750% | 95.714% |
| 9 | 42.857% | 0.000% | 0.000% | 0.000% |
| 10 | 100.000% | 99.999% | 100.000% | 99.438% |
| 11 | 100.000% | 77.500% | 100.000% | 70.000% |

Table 14 is a comparison between the unwashed transport vehicle test results to the transport vehicle that was washed according to the LMW process indicated above. The numbers indicate the percentage decrease in activity between the unwashed swab point and the swab point from the vehicle undergoing the LMW process.

TABLE 15

COMPARISON - HOT WATER TO LMW PROCESS - % DECREASE

| Swab Point | Aerobic Plate Count | Enterobacteriaceae | Yeast | Mold |
|---|---|---|---|---|
| 1 | 96.250% | 0.000% | 99.625% | 95.500% |
| 2 | 0.000% | 0.000% | 0.000% | 0.000% |
| 3 | 94.000% | 0.000% | 0.000% | 0.000% |
| 4 | 10.000% | 0.000% | 0.000% | 0.000% |
| 5 | 0.000% | 0.000% | 91.000% | 0.000% |
| 6 | 0.000% | 0.000% | 10.000% | 0.000% |
| 7 | 42.424% | 0.000% | 0.000% | 0.000% |
| 8 | 91.667% | 0.000% | 77.500% | 0.000% |
| 9 | 20.000% | 0.000% | 0.000% | 0.000% |
| 10 | 98.043% | 0.000% | 0.000% | 10.000% |
| 11 | 55.000% | 0.000% | 10.000% | 0.000% |

Table 15 is a comparison between the transport vehicle wash in hot water only and the transport vehicle that was washed according to the LMW process indicated above. The numbers indicate the percentage decrease in activity between the hot water swab points and the swab points from the vehicle undergoing the LMW process. For example, swab point 10 includes 99.792% less yeast activity by utilizing the LMW process over using hot water alone.

4. Test Vehicle 4

TABLE 16

Microbial Populations in UNWASHED Trailers (CFU/SWAB)

| Swab Point | Aerobic Plate Count | Enterobacteriaceae | Yeast | Mold |
|---|---|---|---|---|
| 1 | 2500000 | 300000 | 11000 | 9 |
| 2 | 280000 | 3500000 | 1900 | 9 |
| 3 | 680000 | 3300000 | 3100 | 9 |
| 4 | 140000 | 140000 | 4000 | 40 |
| 5 | 250000 | 250000 | 9 | 40 |
| 6 | 110000 | 110000 | 1900 | 40 |
| 7 | 2500000 | 580 | 50000 | 160 |
| 8 | 33000 | 290 | 2000 | 150 |
| 9 | 1000000 | 9 | 9 | 20 |
| 10 | 2500000 | 510000 | 3000000 | 25000 |
| 11 | 390000 | 85000 | 190000 | 9 |

Table 16 above indicates the aerobic plate count, the enterobacteriaceae count, the yeast count and the mold count for an unwashed transport vehicle.

TABLE 17

Microbial Populations in HOT WATER WASH Trailers (CFU/SWAB)

| Swab Point | Aerobic Plate Count | Enterobacteriaceae | Yeast | Mold |
|---|---|---|---|---|
| 1 | 30 | 9 | 9 | 9 |
| 2 | 330 | 9 | 360 | 100 |
| 3 | 10 | 9 | 9 | 9 |
| 4 | 10 | 10 | 9 | 10 |
| 5 | 9 | 9 | 9 | 9 |
| 6 | 70 | 9 | 9 | 9 |
| 7 | 50 | 9 | 10 | 9 |
| 8 | 410 | 9 | 9 | 130 |
| 9 | 7200 | 20 | 9 | 9 |
| 10 | 3100 | 9 | 10 | 70 |
| 11 | 160000 | 9 | 9 | 60 |

Table 17 above indicates the aerobic plate count, the enterobacteriaceae count, the yeast count and the mold count for a vehicle that was washed with hot water only.

TABLE 18

Microbial Populations in LOW MICROBIAL WASH PROCESS Trailers (CFU/SWAB)

| Swab Point | Aerobic Plate Count | Enterobacteriaceae | Yeast | Mold |
|---|---|---|---|---|
| 1 | 40 | 9 | 10 | 9 |
| 2 | 450 | 9 | 30 | 10 |
| 3 | 9 | 9 | 9 | 9 |
| 4 | 9 | 9 | 9 | 9 |
| 5 | 9 | 9 | 9 | 9 |
| 6 | 9 | 9 | 9 | 9 |
| 7 | 10 | 9 | 9 | 9 |
| 8 | 370 | 9 | 9 | 9 |
| 9 | 240 | 9 | 9 | 9 |
| 10 | 940 | 9 | 9 | 10 |
| 11 | 9 | 9 | 9 | 9 |

Table 18 above indicates the aerobic plate count, the enterobacteriaceae count, the yeast count and the mold count for a transport vehicle washed according to the LMW process indicated above.

TABLE 19

COMPARISON - UNWASHED TO LMW PROCESS - % DECREASE

| Swab Point | Aerobic Plate Count | Enterobacteriaceae | Yeast | Mold |
|---|---|---|---|---|
| 1 | 99.998% | 99.997% | 99.909% | 0.000% |
| 2 | 99.839% | 100.000% | 98.421% | 0.000% |
| 3 | 99.999% | 100.000% | 99.710% | 0.000% |
| 4 | 99.994% | 99.994% | 99.775% | 77.500% |

TABLE 19-continued

COMPARISON - UNWASHED TO LMW PROCESS - % DECREASE

| Swab Point | Aerobic Plate Count | Enterobacteriaceae | Yeast | Mold |
|---|---|---|---|---|
| 5 | 99.996% | 99.996% | 0.000% | 77.500% |
| 6 | 99.992% | 99.992% | 99.526% | 77.500% |
| 7 | 100.000% | 98.448% | 99.982% | 94.375% |
| 8 | 98.879% | 96.897% | 99.550% | 94.000% |
| 9 | 99.976% | 0.000% | 0.000% | 55.000% |
| 10 | 99.962% | 99.998% | 100.000% | 99.960% |
| 11 | 99.998% | 99.989% | 99.995% | 0.000% |

Table 19 is a comparison between the unwashed transport vehicle test results to the transport vehicle that was washed according to the LMW process indicated above. The numbers indicate the percentage decrease in activity between the unwashed swab point and the swab point from the vehicle undergoing the LMW process.

TABLE 20

COMPARISON - HOT WATER TO LMW PROCESS - % DECREASE

| Swab Point | Aerobic Plate Count | Enterobacteriaceae | Yeast | Mold |
|---|---|---|---|---|
| 1 | 0.000% | 0.000% | 0.000% | 0.000% |
| 2 | 0.000% | 0.000% | 91.667% | 90.000% |
| 3 | 10.000% | 0.000% | 0.000% | 0.000% |
| 4 | 10.000% | 10.000% | 0.000% | 10.000% |
| 5 | 0.000% | 0.000% | 0.000% | 0.000% |
| 6 | 87.143% | 0.000% | 0.000% | 0.000% |
| 7 | 80.000% | 0.000% | 10.000% | 0.000% |
| 8 | 9.756% | 0.000% | 0.000% | 93.077% |
| 9 | 96.667% | 55.000% | 0.000% | 0.000% |
| 10 | 69.677% | 0.000% | 10.000% | 85.714% |
| 11 | 99.994% | 0.000% | 0.000% | 85.000% |

Table 20 is a comparison between the transport vehicle wash in hot water only and the transport vehicle that was washed according to the LMW process indicated above. The numbers indicate the percentage decrease in activity between the hot water swab points and the swab points from the vehicle undergoing the LMW process.

5. Test Vehicle 5

TABLE 21

Microbial Populations in UNWASHED Trailers (CFU/SWAB)

| Swab Point | Aerobic Plate Count | Enterobacteriaceae | Yeast | Mold |
|---|---|---|---|---|
| 1 | 2500000 | 2500000 | 20000 | 100 |
| 2 | 2500000 | 2000000 | 22000 | 60 |
| 3 | 2500000 | 1600000 | 18000 | 9 |
| 4 | 2500000 | 1200000 | 1900 | 290 |
| 5 | 2500000 | 2800000 | 3000000 | 9 |
| 6 | 2500000 | 1200000 | 9 | 2700 |
| 7 | 2500000 | 64000 | 450000 | 37000 |
| 8 | 300000 | 5400 | 220 | 10 |
| 9 | 4900 | 9 | 190 | 10 |
| 10 | 2500000 | 220000 | 3500000 | 21000 |
| 11 | 290000 | 92000 | 45000 | 200 |

Table 21 above indicates the aerobic plate count, the enterobacteriaceae count, the yeast count and the mold count for an unwashed transport vehicle.

TABLE 22

Microbial Populations in HOT WATER WASH Trailers (CFU/SWAB)

| Swab Point | Aerobic Plate Count | Enterobacteriaceae | Yeast | Mold |
|---|---|---|---|---|
| 1 | 30 | 9 | 9 | 9 |
| 2 | 3700 | 130 | 5200 | 40 |
| 3 | 10 | 9 | 9 | 9 |
| 4 | 740 | 210 | 550 | 9 |
| 5 | 9 | 9 | 9 | 9 |
| 6 | 1400 | 9 | 50 | 500 |
| 7 | 30 | 9 | 9 | 9 |
| 8 | 1000 | 9 | 50 | 9 |
| 9 | 9 | 9 | 9 | 9 |
| 10 | 1300000 | 9 | 2500 | 9 |
| 11 | 14000 | 180 | 24000 | 9 |

Table 22 above indicates the aerobic plate count, the enterobacteriaceae count, the yeast count and the mold count for a vehicle that was washed with hot water only.

TABLE 23

Microbial Populations in LOW MICROBIAL WASH PROCESS Trailers (CFU/SWAB)

| Swab Point | Aerobic Plate Count | Enterobacteriaceae | Yeast | Mold |
|---|---|---|---|---|
| 1 | 40 | 180 | 130 | 9 |
| 2 | 100 | 9 | 60 | 70 |
| 3 | 20 | 9 | 9 | 9 |
| 4 | 9 | 9 | 9 | 9 |
| 5 | 9 | 9 | 9 | 9 |
| 6 | 160 | 60 | 9 | 10 |
| 7 | 10 | 9 | 9 | 10 |
| 8 | 10 | 9 | 9 | 10 |
| 9 | 40 | 9 | 9 | 10 |
| 10 | 34000 | 9 | 180000 | 9 |
| 11 | 70 | 230 | 230 | 9 |

Table 23 above indicates the aerobic plate count, the enterobacteriaceae count, the yeast count and the mold count for a transport vehicle washed according to the LMW process indicated above.

TABLE 24

COMPARISON - UNWASHED TO LMW PROCESS - % DECREASE

| Swab Point | Aerobic Plate Count | Enterobacteriaceae | Yeast | Mold |
|---|---|---|---|---|
| 1 | 99.998% | 99.993% | 99.350% | 91.000% |
| 2 | 99.996% | 100.000% | 99.727% | 0.000% |
| 3 | 99.999% | 99.999% | 99.950% | 0.000% |
| 4 | 100.000% | 99.999% | 99.526% | 96.897% |
| 5 | 100.000% | 100.000% | 100.000% | 0.000% |
| 6 | 99.994% | 99.995% | 0.000% | 99.630% |
| 7 | 100.000% | 99.986% | 99.998% | 99.973% |
| 8 | 99.997% | 99.833% | 95.909% | 0.000% |
| 9 | 99.184% | 0.000% | 95.263% | 0.000% |
| 10 | 98.640% | 99.996% | 94.857% | 99.957% |
| 11 | 99.976% | 99.750% | 99.489% | 95.500% |

Table 24 is a comparison between the unwashed transport vehicle test results to the transport vehicle that was washed according to the LMW process indicated above. The numbers indicate the percentage decrease in activity between the unwashed swab point and the swab point from the vehicle undergoing the LMW process.

TABLE 25

COMPARISON - HOT WATER TO LMW PROCESS - % DECREASE

| Swab Point | Aerobic Plate Count | Enterobacteriaceae | Yeast | Mold |
|---|---|---|---|---|
| 1 | 0.000% | 0.000% | 0.000% | 0.000% |
| 2 | 97.297% | 93.077% | 98.846% | 0.000% |
| 3 | 0.000% | 0.000% | 0.000% | 0.000% |
| 4 | 98.784% | 95.714% | 98.364% | 0.000% |
| 5 | 0.000% | 0.000% | 0.000% | 0.000% |
| 6 | 88.571% | 0.000% | 82.000% | 98.000% |
| 7 | 66.667% | 0.000% | 0.000% | 0.000% |
| 8 | 99.000% | 0.000% | 82.000% | 0.000% |
| 9 | 0.000% | 0.000% | 0.000% | 0.000% |
| 10 | 97.385% | 0.000% | 0.000% | 0.000% |
| 11 | 99.500% | 0.000% | 99.042% | 0.000% |

Table 25 is a comparison between the transport vehicle wash in hot water only and the transport vehicle that was washed according to the LMW process indicated above. The numbers indicate the percentage decrease in activity between the hot water swab points and the swab points from the vehicle undergoing the LMW process.

C. Product

As further indicated herein, a LM bulk product is further disclosed. The attributes of the LM bulk product are described below at the receipt facility after the LM bulk product has been transported to a customer. Stated another way, the attributes indicated below can be of a LM bulk product in a vessel just prior to being blown from the vessel to a load-out bin located at a customer. As stated above, the LM bulk product can include, for example, flour of all types, bran, germ, grains, oats, wheat, rye, barley and the like. It is further contemplated that LM bulk product that utilize the processes herein can include various ingredient types, sugars, spices and such. It is also contemplated that LM bulk products that utilize the processes herein can include products that are first dehydrated and then milled or ground such as peppers, vegetables, fruits and the like.

A LM bulk product can be a milled product that includes no detectable traces of active microorganisms. In another aspect, a LM bulk product can be a milled product that includes no detectable traces of active microorganisms above a threshold set by a government body such as, for example, the United States Food and Drug Administration (or another country's governing body). The confidence level of the sterility can be about 50% to about 99.99%. The confidence level of the sterility can be about 50%, 55%, 60%, 65%, 70%, 75%, 80%, 85%, 90%, 95%, 96%, 97%, 98%, 99%, 99.1%, 99.2%, 99.3%, 99.4%, 99.41%, 99.42%, 99.43%, 99.44%, 99.45%, 99.46%, 99.47%, 99.48%, 99.49%, 99.50%, 99.51%, 99.52%, 99.53%, 99.54%, 99.55%, 99.56%, 99.57%, 99.58%, 99.59%, 99.60%, 99.61%, 99.62%, 99.63%, 99.64%, 99.65%, 99.66%, 99.67%, 99.68%, 99.69%, 99.70%, 99.71%, 99.72%, 99.73%, 99.74%, 99.75%, 99.76%, 99.77%, 99.78%, 99.79%, 99%, 80%, 99.81%, 99.82%, 99.83%, 99.84%, 99.85%, 99.86%, 99.87%, 99.88%, 99.89%, 99.90%, 99.91%, 99.92%, 99.93%, 99.94%, 99.95%, 99.96%, 99.97%, 99.98%, 99.99%, 100% to about 50%, 55%, 60%, 65%, 70%, 75%, 80%, 85%, 90%, 95%, 96%, 97%, 98%, 99%, 99.1%, 99.2%, 99.3%, 99.4%, 99.41%, 99.42%, 99:43%, 99.44%, 99.45%, 99.46%, 99.47%, 99.48%, 99.49%, 99.50%, 99.51%, 99.52%, 99.53%, 99.54%, 99.55%, 99.56%, 99.57%, 99.58%, 99.59%, 99.60%, 99.61%, 99.62%, 99.63%, 99.64%, 99.65%, 99.66%, 99.67%, 99.68%, 99.69%, 99.70%, 99.71%, 99.72%, 99.73%, 99.74%, 99.75%, 99.76%, 99.77%, 99.78%, 99.79%, 99.80%, 99.81%, 99.82%, 99.83%, 99.84%, 99.85%, 99.86%, 99.87%, 99.88%, 99.89%, 99.90%, 99.91%, 99.92%, 99.93%, 99.94%, 99.95%, 99.96%, 99.97%, 99.98%, 99.99%, 100%. The confidence level of the sterility can be greater than 99.6%

The percentage of denaturation of the LM bulk product can be about 5% to about 10%. The percentage of denaturation of the LM bulk product can be about 5%, 5.5%, 6.0%, 6.5%, 7.0%, 7.5%, 8.0%, 8.5%, 9.0%, 9.5%, 10% to about 5%, 5.5%, 6.0%, 6.5%, 7.0%, 7.5%, 8.0%, 8:5%, 9.0%, 9.5%, 10%. In still other aspects, the percentage of denaturation can be less than about 5%

The moisture content of the LM bulk product can be about 4%, 5%, 6%, 7%, 8%, 9%, 10%, 11%, 12%, 13%, 14%, 15%, 16%, 17%, 18%, 19%, 20% to about 4%, 5%, 6%, 7%, 8%, 9%, 10%, 11%, 12%, 13%, 14%, 15%, 16%, 17%, 18%, 19%, and 20%.

The water activity of the LM bulk product can be about 0.01, 0.05, 0.10, 0.15, 0.20, 0.25, 0.30, 0.35, 0.40, 0.45, 0.50, 0.55, 0.60 to about 0.01, 0.05, 0.10, 0.15, 0.20, 0.25, 0.30, 0.35, 0.40, 0.45, 0.50, 0.55, 0.60. The water activity of the LM bulk product can be below about 0.6.

The ash content of the LM bulk product can be about 0.30%, 0.35%, 0.40%, 0.45%, 0.50%, 0.55%, 0.60%, 0.65%, 0.70% to about 0.30%, 0.35%, 0:40%, 0.45%, 0.50%, 0.55%, 0.60%, 0.65%, 0.70%.

The viscosity of the LM bulk product can be measured by a falling number instrument by measuring the resistance of a flour and water paste to a falling stirrer. The falling number analysis can give an indication of the amount of alpha amylase activity in the LM bulk product. The viscosity value associated with the falling number instrument can be about 200 seconds, 225 seconds, 250 seconds, 275 seconds, 300 seconds, 325 seconds, 350 seconds, 375 seconds, 400 seconds, 425 seconds, 450 seconds, 475 seconds, 500 seconds to about 200 seconds, 225 seconds, 250 seconds, 275 seconds, 300 seconds, 325 seconds, 350 seconds, 375 seconds, 400 seconds, 425 seconds, 450 seconds, 475 seconds, 500 seconds.

The LM bulk product can further include one or more of the characteristics more fully set forth in provisional patent application No. 61/296,477 titled MICROBIAL REDUCTION IN A PROCESSING STREAM OF MILLED PRODUCTS.

D. Exemplary Computing System

Figure 22:
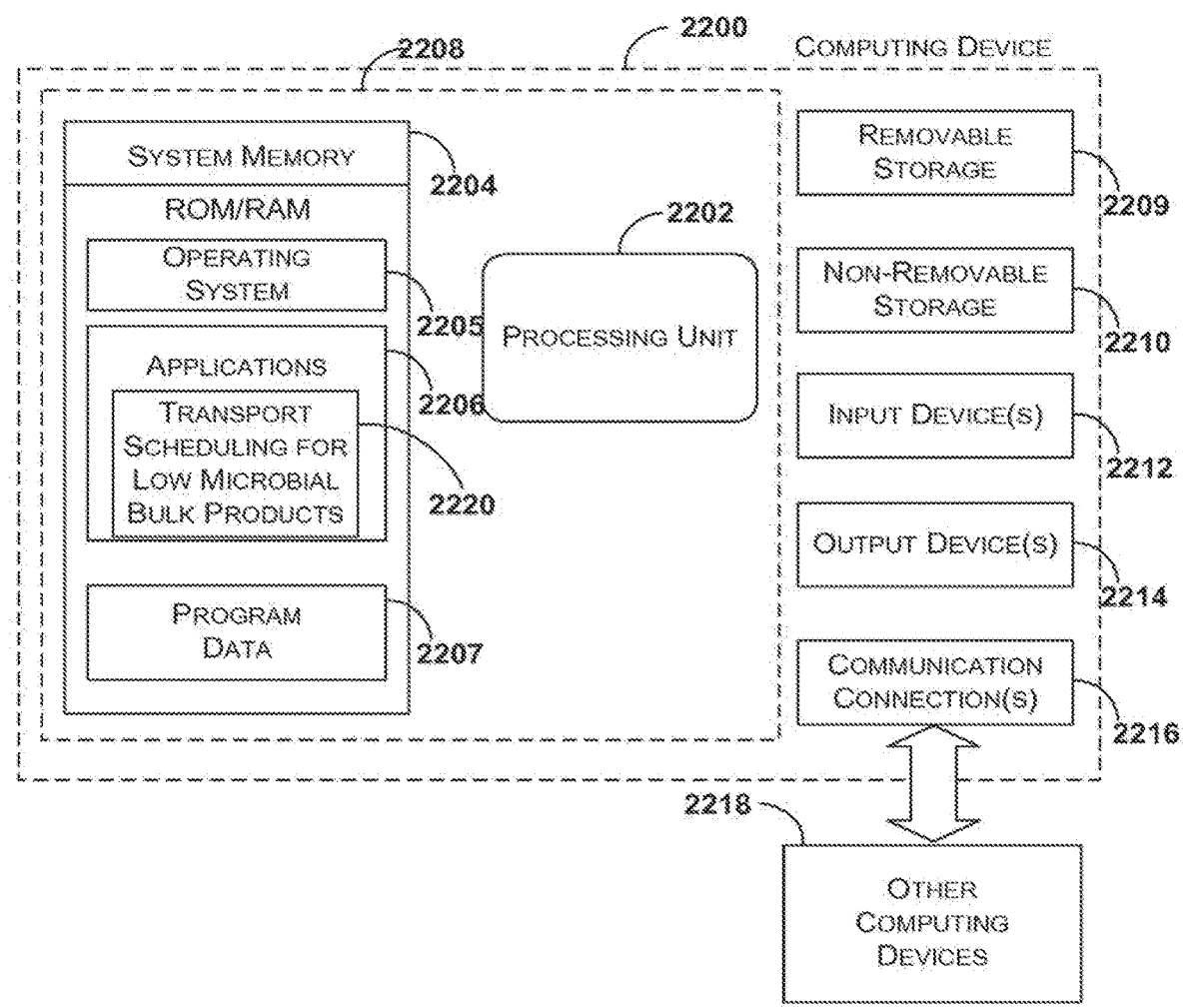
FIG. 22 is an example computer system.

FIG. 22 is an exemplary computing system that can be utilized in various aspects for transport scheduling for low microbial bulk products. Referring to FIG. 22, an example system includes a computing device, such as computing device 2200. Computing device 2200 can include at least one hardware processing unit 2202 and system memory 2204. Depending on the configuration and type of computing device 2200, system memory 2204 can be volatile (such as RAM), non-volatile (such as ROM, flash memory and the like) or some combination of the two. System memory 2204 can include operating system 2205, one or more applications 2206 and can include program data 2207. In one aspect, applications 2206 further include application 2220 for transport scheduling for low microbial bulk products. The aforementioned configuration is illustrated in FIG. 22 by those components within dashed line 2208.

Computing device 2200 can also have additional features or functionality. For example, computing device 2200 can also include additional data storage devices (removable and/or non-removable) such as, for example, magnetic disks, optical disks or tape. Such additional storage is illustrated in FIG. 22 by computer-readable storage medium 2209 and non-removable storage 2210. Computer-readable storage medium can include volatile and non-volatile, removable and non-removable media implemented by, for example, stored computer readable instructions, stored data structures, stored program modules or other stored data. System memory 2204, computer readable storage medium 2209 and non-removable storage 2210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by computing device 2200. Any such computer storage media can be part of device 2200. Computing device 2200 can also have input device(s) 2212 such as a keyboard, mouse, pen, voice input device, touch input device, etc. Output device(s) 2214 such as a display, speakers, printer, etc., can also be included. All these devices are known in the art and need not be discussed at length here.

Computing device 2200 also contains communication connection(s) 2216 that allow the device to communicate with other computing devices 2218, such as over a network or a wireless network. Communication connection(s) 2216 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A process comprising:
 receiving, on a computing device, an indication that a low microbial (LM) bulk product vessel exceeds a low microbial wash (LMW) timing threshold, the LMW timing threshold being based on a product specification indicating a microbial baseline for a low microbial bulk product and being a maximum amount of time between low microbial (LM) washes for the LM bulk product vessel;
 causing the computing device to schedule a time for a low microbial wash (LMW) process;
 at the time for a low microbial wash (LMW) process, causing the LMW process to be performed, wherein the LMW process includes:
  removing vessel accessibility components from the LM bulk product vessel,
  subjecting the LM bulk product vessel to a sanitary solution bath,
  subjecting the LM bulk product vessel to a rinse operation, wherein the rinse operation includes actuating spinners by forcing hot water through the spinners to cause dispersion of the hot water within an interior of the LM bulk product vessel, and
  actuating the spinners by forcing sanitary solution through the spinners to cause dispersion of the sanitary solution within the interior of the LM bulk product vessel; and
 causing the computing device to update a low microbial wash (LMW) record for the LM bulk product vessel to indicate a completion date of the LMW process and to qualify the LM bulk product vessel for transporting an LM bulk product.

2. The process of claim 1, wherein the time threshold is at least 15 consecutive minutes and the hot water is at a temperature from about 140° F. to about 215° F.

3. The process of claim 1, wherein the sanitary solution bath is an ammonia based sanitizer at a concentration from about 150 ppm to about 450 ppm.

4. The process of claim 1, wherein the sanitary solution bath is a benzalkonium chloride compound at a concentration from about 150 ppm to about 450 ppm.

5. The process of claim 1, wherein the LM bulk product vessel is a bulk flour vessel located on a road vehicle.

6. The process of claim 1, wherein the vehicle accessibility components include at least one member of a group consisting of: valves, caps, gaskets, lids, product lines and screens.

7. A process comprising:
 receiving an indication that a low microbial (LM) bulk product vessel exceeds a low microbial wash (LMW) timing threshold, the LMW timing threshold being based on a product specification indicating a microbial baseline for a low microbial bulk product and being a maximum amount of time between low microbial (LM) washes for the bulk product vessel;
 in response to the indication, causing a low microbial wash (LMW) process to be performed, wherein the LMW process includes:
  removing vessel accessibility components from the LM bulk product vessel,
  subjecting the LM bulk product vessel to a sanitary solution bath, and
  actuating spinners by forcing sanitary solution through the spinners to cause dispersion of the sanitary solution within the interior of the LM bulk product vessel; and
 updating a low microbial wash (LMW) record for the LM bulk product vessel to indicate a completion date of the LMW process, the completion date being a starting time for a next LMW timing threshold determination.

8. The process of claim 7, further comprising, subjecting the LM bulk product vessel to a rinse operation in association with a time threshold, wherein the rinse operation includes actuating the spinners by forcing hot water through the spinners to cause dispersion of the hot water within the interior of the LM bulk product vessel.

9. The process of claim 8, wherein the time threshold is at least 15 consecutive minutes and the hot water is at a temperature from about 140° F. to about 215° F.

10. The process of claim 7, wherein the sanitary solution bath is an ammonia based sanitizer at a concentration from about 150 ppm to about 450 ppm.

11. The process of claim 7, wherein the sanitary solution bath is a benzalkonium chloride compound at a concentration from about 150 ppm to about 450 ppm.

12. The process of claim 7, wherein the LM bulk product vessel is a bulk flour vessel located on a road vehicle.

13. The process of claim 7, wherein the vehicle accessibility components include at least one member of a group consisting of: valves, caps, gaskets, lids, product lines and screens.

14. The process of claim 7, wherein causing a LMW process to be performed includes causing a computing device to schedule the LMW process.

15. The process of claim 7, wherein updating the LMW record includes causing a computing device to qualify the LM bulk product vessel for transporting an LM bulk product.

* * * * *